(12) United States Patent
Taniguchi et al.

(10) Patent No.: US 8,550,969 B2
(45) Date of Patent: Oct. 8, 2013

(54) CHARGING MEMBER, PROCESS CARTRIDGE, AND ELECTROPHOTOGRAPHIC APPARATUS

(75) Inventors: Tomohito Taniguchi, Suntou-gun (JP); Satoshi Koide, Susono (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/416,910

(22) Filed: Mar. 9, 2012

(65) Prior Publication Data

US 2012/0177402 A1 Jul. 12, 2012

Related U.S. Application Data

(63) Continuation of application No. PCT/JP2011/073277, filed on Oct. 4, 2011.

(30) Foreign Application Priority Data

Oct. 8, 2010 (JP) .................................. 2010-228367

(51) Int. Cl.
*F16C 13/00* (2006.01)
*G03G 15/02* (2006.01)

(52) U.S. Cl.
USPC .............. 492/56; 492/53; 399/176; 399/111; 399/168

(58) Field of Classification Search
USPC ................ 492/56, 53, 59, 49; 399/111, 168, 399/176
See application file for complete search history.

(56) References Cited

U.S. PATENT DOCUMENTS

| 4,937,165 A | * | 6/1990 | Ong et al. .................... 430/58.7 |
| 5,011,906 A | * | 4/1991 | Ong et al. .................... 528/176 |
| 5,659,854 A | | 8/1997 | Masuda et al. |
| 5,731,120 A | * | 3/1998 | Tanigami et al. ........ 430/111.35 |
| 5,802,428 A | * | 9/1998 | Ohno et al. .................... 399/222 |
| 5,834,166 A | * | 11/1998 | Lau et al. ...................... 430/385 |
| 5,851,657 A | * | 12/1998 | Yasuno et al. ................ 428/332 |
| 6,002,901 A | * | 12/1999 | Hoshizaki et al. ............ 399/159 |
| 6,146,320 A | | 11/2000 | Yoshikawa et al. |
| 6,472,118 B1 | * | 10/2002 | Yamaguchi et al. ..... 430/111.35 |

(Continued)

FOREIGN PATENT DOCUMENTS

| JP | 8-69148 A | 3/1996 |
| JP | 2001-56018 A | 2/2001 |

(Continued)

OTHER PUBLICATIONS

PCT International Search Report of the International Searching Authority, International Application No. PCT/JP2011/073277, Mailing Date Nov. 1, 2011.

(Continued)

*Primary Examiner* — Essama Omgba
(74) *Attorney, Agent, or Firm* — Fitzpatrick, Cella, Harper & Scinto

(57) ABSTRACT

A charging member, a process cartridge and an electrophotographic apparatus are provided which have been so made as for any C-set images to be kept from occurring; the C-set images occurring in a charging member of an electrophotographic apparatus where the charging member and an electrophotographic photosensitive member have been left to stand in contact with each other over a long period of time. In a charging member having a conductive support and a surface layer, the surface layer is incorporated with a specific compound.

3 Claims, 4 Drawing Sheets

(56) References Cited

U.S. PATENT DOCUMENTS

| | | | |
|---|---|---|---|
| 6,599,672 B2* | 7/2003 | Yamaguchi et al. | 430/137.13 |
| 6,739,534 B2* | 5/2004 | Yamaguchi et al. | 241/68 |
| 6,743,558 B2* | 6/2004 | Yamaguchi et al. | 430/111.33 |
| 7,192,679 B2* | 3/2007 | Yamaguchi et al. | 430/111.33 |
| 7,381,510 B2 | 6/2008 | Akiyama et al. | |
| 7,416,828 B2* | 8/2008 | Kurosu | 430/122.2 |
| 7,962,068 B2* | 6/2011 | Kuroda et al. | 399/176 |
| 8,067,141 B2* | 11/2011 | Yamaguchi et al. | 430/110.2 |
| 8,092,358 B2* | 1/2012 | Kuruma et al. | 492/53 |
| 8,211,610 B2* | 7/2012 | Yamaguchi et al. | 430/111.35 |
| 8,277,947 B2* | 10/2012 | Mayuzumi et al. | 428/447 |
| 8,376,922 B2* | 2/2013 | Akama et al. | 492/56 |
| 8,401,425 B2* | 3/2013 | Kuroda et al. | 399/111 |
| 2005/0064315 A1* | 3/2005 | Yamaguchi et al. | 430/111.31 |
| 2005/0079434 A1* | 4/2005 | Suzuki et al. | 430/111.41 |
| 2006/0063093 A1* | 3/2006 | Kurosu | 430/122 |
| 2006/0210905 A1* | 9/2006 | Imahashi et al. | 430/111.35 |
| 2007/0140749 A1* | 6/2007 | Miyamoto et al. | 399/267 |
| 2007/0202430 A1* | 8/2007 | Suzuki et al. | 430/111.35 |
| 2008/0063969 A1* | 3/2008 | Yamaguchi et al. | 430/110.2 |
| 2008/0292366 A1 | 11/2008 | Akama et al. | |
| 2009/0041510 A1* | 2/2009 | Imahashi et al. | 399/277 |
| 2010/0239975 A1* | 9/2010 | Yamaguchi et al. | 430/111.35 |
| 2011/0217072 A1* | 9/2011 | Kuroda et al. | 399/111 |
| 2012/0058423 A1* | 3/2012 | Yamaguchi et al. | 430/105 |
| 2012/0141162 A1* | 6/2012 | Mayuzumi et al. | 399/111 |
| 2012/0148306 A1* | 6/2012 | Tomomizu et al. | 399/168 |
| 2013/0034369 A1* | 2/2013 | Masu et al. | 399/111 |
| 2013/0064571 A1* | 3/2013 | Kodama et al. | 399/111 |

FOREIGN PATENT DOCUMENTS

| | | |
|---|---|---|
| JP | 2001-305832 A | 11/2001 |
| JP | 2002-214881 A | 7/2002 |
| JP | 2002-214882 A | 7/2002 |
| JP | 2002-214883 A | 7/2002 |
| JP | 2003-316123 A | 11/2003 |
| JP | 2003-316124 A | 11/2003 |
| JP | 2005-352158 A | 12/2005 |
| JP | 2009-58634 A | 3/2009 |

OTHER PUBLICATIONS

International Preliminary Report on Patentability, International Application No. PCT/JP2011/073277, Mailing Date Apr. 18, 2013.

* cited by examiner

CHARGING MEMBER, PROCESS CARTRIDGE, AND ELECTROPHOTOGRAPHIC APPARATUS

CROSS-REFERENCE TO RELATED APPLICATIONS

This application is a continuation of International Application No. PCT/JP2011/073277, filed Oct. 4, 2011, which claims the benefit of Japanese Patent Application No. 2010-228367, filed on Oct. 8, 2010.

BACKGROUND OF THE INVENTION

1. Field of the Invention

This invention relates to a charging member, a process cartridge and an electrophotographic apparatus.

2. Description of the Related Art

In electrophotographic apparatus, a roller-shaped charging member (hereinafter also "charging roller") used in contact charging of an electrophotographic photosensitive member is kept in contact with the electrophotographic photosensitive member by pressing force of a spring or the like, and is so disposed as to be follow-up rotated with the latter. Hence, where the apparatus has been left to stand still over a long period of time, what is called permanent compression set (or "compression set"; hereinafter "C-set") may come about at the part of contact of the charging roller with the electrophotographic photosensitive member. If the environment where the apparatus has been left to stand has high temperature and high humidity, the C-set tends to more come about.

In recent years, the electrophotographic apparatus are demanded to be much more high-speed, more high-quality for images and more high-durability, and it is sought to remedy the C-set. If the electrophotographic photosensitive member is charged with use of a charging roller having caused the C-set, it may become unable to maintain any uniform micro-discharge gap when the part standing come into C-set (hereinafter "C-set part") passes through a discharge region, so that a difference in charging ability may unwantedly come between the C-set part and any non-C-set part. As the result, image density non-uniformity called horizontal black lines and/or horizontal white lines in the lengthwise direction (hereinafter "C-set images") occurs at the position corresponding to the C-set part of the charging roller. The C-set images also more tend to occur when the voltage applied to the charging member is only direct-current voltage.

For such problems, Japanese Patent Application Laid-open No. H08-69148 discloses that an urethane foam provided with electrical conductivity by carbon black or the like is best as a material for charging assemblies that has a low hardness and also is less causative of compression set.

SUMMARY OF THE INVENTION

However, according to studies made by the present inventors, they have come to the realization that a charging member is necessary which can much more keep the C-set images from occurring under high-temperature and high-humidity conditions.

Accordingly, the present invention is directed to providing a charging member that can more surely keep the C-set images from occurring, in various environments. Further, the present invention is directed to providing a process cartridge, and an electrophotographic apparatus, that can stably form high-grade electrophotographic images even in various environments.

According to one aspect of the present invention, there is provided a charging member comprising a conductive support, an elastic layer and a surface layer, wherein the surface layer comprises a binder and a compound represented by the following formula (1).

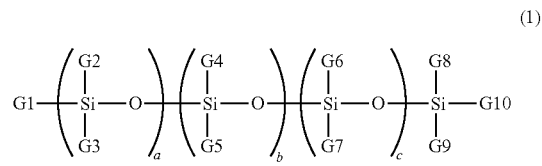

In the formula (1), G1 to G10 each independently represent a hydrogen atom, an alkyl group having 1 to 3 carbon atom(s), a phenyl group or a group represented by the following formula (2), provided that one or two or more selected from G1 to G10 is/are the group(s) represented by the following formula (2); and a, b and c each represent an integer of 0 or more with the proviso that the group represented by the following formula (2) exists in the molecule of the compound.

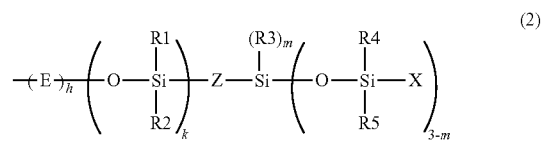

In the formula (2), h and k are each 0 or 1, and m is 0 or 1; E and Z each independently represent an alkylene group having 2 to 6 carbon atoms, a phenylene group which may be substituted with a methyl group or ethyl group, or a group represented by the following formula (3) or the following formula (4); R1, R2, R4 and R5 each independently represent an alkyl group having 1 to 3 carbon atom(s) or a phenyl group; R3 represents an alkoxyl group having 1 to 3 carbon atom(s) or a trimethylsiloxy group; X represents a hydrogen atom, an alkyl group having 1 to 15 carbon atom(s), a phenyl group which may be substituted with a methyl group or ethyl group, an allyl group, a vinyl group or a group represented by the following formula (6) or the formula (2).

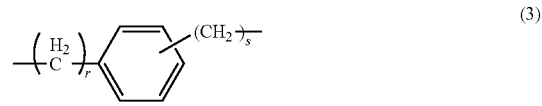

In the formula (3), r and s each represent an integer of 0 to 3, and either of r and s is 1 or more.

In the formula (4), p is 0 or 1, R6 and R8 each represent an alkylene group having 1 to 4 carbon atom(s), and R7 represents an oxygen atom or a group represented by the following formula (5).

(5)

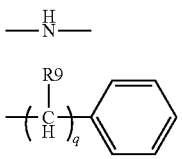

(6)

In the formula (6), q is an integer of 1 to 4, and R9 represents a hydrogen atom or a methyl group.

According to another aspect of the present invention, there is provide a process cartridge comprising the above charging member and a charging object member, and being so constituted as to be detachably mountable to the main body of an electrophotographic apparatus.

According to further aspect of the present invention, there is provided an electrophotographic apparatus comprising the above charging member and a charging object member disposed in contact with the charging member.

The charging member according to the present invention enables the charging member itself to lessen its level of strain coming after it has been left to stand while being kept in contact with the electrophotographic photosensitive member over a long period of time (hereinafter "C-set level"). At the same time, it enables the charging member itself to be improved in its charging ability. Thus, the C-set images can be kept from occurring.

DESCRIPTION OF THE EMBODIMENTS

Figure 1A:
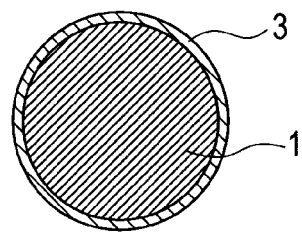
FIG. 1A is a sectional view showing an example of the charging member (roller shaped) of the present invention.

Preferred embodiments of the present invention will now be described in detail in accordance with the accompanying drawings.

The charging member of the present invention is a charging member having an elastic layer and a surface layer on a conductive support, and being kept in contact with a charging object member to charge the charging object member electrostatically. Then, the surface layer of the charging member contains a binder and a compound represented by the following formula (1).

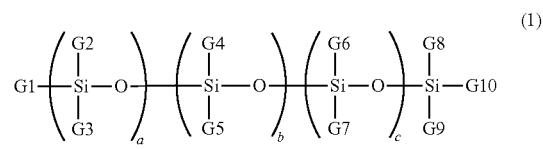

(1)

In the formula (1), G1 to G10 each independently represent a hydrogen atom, an alkyl group having 1 to 3 carbon atom(s), a phenyl group or a group represented by the following formula (2). Also, one or two or more of G1 to G10 is/are the group(s) represented by the following formula (2).

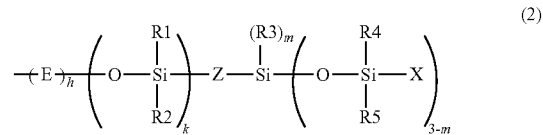

(2)

In the formula (2), h and k are each 0 or 1, and m is 0 or 1; E and Z each independently represent an alkylene group having 2 to 6 carbon atoms, a phenylene group which may be substituted with a methyl group or ethyl group, or a group represented by the following formula (3) or the following formula (4); R1, R2, R4 and R5 each independently represent an alkyl group having 1 to 3 carbon atom(s) or a phenyl group; R3 represents an alkoxyl group having 1 to 3 carbon atom(s) or a trimethylsiloxy group; X represents a hydrogen atom, an alkyl group having 1 to 15 carbon atom(s), a phenyl group which may be substituted with a methyl group or ethyl group, an allyl group, a vinyl group or a group represented by the following formula (6) or the formula (2).

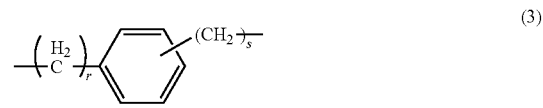

(3)

In the formula (3), r and s each represent an integer of 0 to 3, and either of r and s is 1 or more.

(4)

In the formula (4), p is 0 or 1, R6 and R8 each represent an alkylene group having 1 to 4 carbon atom(s), and R7 represents an oxygen atom or a group represented by the following formula (5).

(5)

(6)

In the formula (6), q is an integer of 1 to 4, and R9 represents a hydrogen atom or a methyl group.

As to E and Z, they may each preferably be at least one of structures represented by the following formulas (7) and (8).

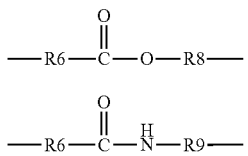
(7)

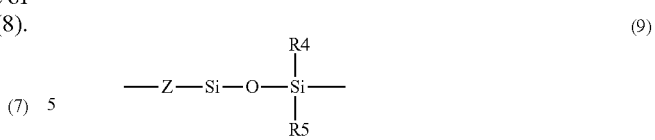
(9)

(8)

In the formulas (7) and (8), R6, R8 and R9 each independently represent an alkylene group having 1 to 4 carbon atom(s). In virtue of such a structure(s), the compound can more be improved in its stability when it is incorporated in the surface layer. R6, R8 and R9 are each exemplified by a methylene group, an ethylene group, a propylene group and a butylene group, of which a methylene group and a propylene group are preferred.

In the formula (2), R1, R2, R4 and R5 each independently represent an alkyl group having 1 to 3 carbon atom(s) or a phenyl group. The alkyl group is exemplified by a methyl group, an ethyl group and a propyl group. Of these, a methyl group is preferred. R3 is an alkoxyl group having 1 to 3 carbon atom(s) or a trimethylsiloxy group. The alkoxyl group may be exemplified by the alkyl group exemplified for R1 to which an oxygen atom stands bonded. X is, as defined above, a hydrogen atom, an alkyl group having 1 to 15 carbon atom(s), a phenyl group which may be substituted with a methyl group or ethyl group, an allyl group, a vinyl group or a group represented by the formula (6) or the formula (2). The alkyl group may include as specific examples thereof methyl, ethyl, n-propyl, i-propyl, cyclopropyl, n-butyl, i-butyl, sec-butyl, tert-butyl, cyclobutyl, n-pentyl, tert-amyl, cyclopentyl, n-hexyl, cyclohexyl and 2-ethylhexyl groups.

The structure represented by the formula (2) has a bulky structure that affords a multi-branched structure in which siloxane linkages and a silalkylene group are alternately arranged. A surface layer containing as a binder resin a compound having such a specific or particular structure is kept from being moisture-absorptive, and the surface layer is kept from taking its molecular motion. As the result, this can lessen the level of strain coming when a stress is applied to the charging member. Also, as having a structure containing silicon atoms in a large number, the surface layer can be improved in its dielectric constant, and be improved in its charging ability. These effects enable the C-set images from occurring.

That the surface layer is kept from being moisture-absorptive also enables the charging member to be prevented from any environmental variations. More specifically, according to the charging member of the present invention, it can stably charge the electrophotographic photosensitive member and so forth in any environments of from a high-temperature and high-humidity environment to a low-temperature and low-humidity environment.

In the formula (2), it is preferable that m is 0. It is also preferable that h and k are each 0, and it is further preferable that, in the structure represented by the formula (2), the repetition of a structure represented by the following formula (9) is one time or three times. This enables the surface layer to be further kept from being moisture-absorptive.

The compound represented by the formula (1) may preferably have the above alkyl group having 1 to 10 carbon atom(s), at every terminal of the branched structure. Of these, an alkyl group having 1 to 10 carbon atom(s) is preferred, and further an alkyl group having 1 to 4 carbon atom(s) is particularly preferred. This enables the surface layer to be further kept from being moisture-absorptive.

The compound represented by the formula (1) may have a number-average molecular weight of approximately from 600 to 100,000 and particularly from 1,500 to 50,000.

The compound represented by the formula (1) may be produced by using as a raw material a compound containing a hydrogen atom bonded to a silicon atom (hereinafter simply "Si-bonded hydrogen atom") (hereinafter the compound is called "Si-bonded hydrogen atom-containing compound").

A process for producing the compound represented by the formula (1) may include as an example thereof a process in which the Si-bonded hydrogen atom-containing compound is put to any of the following steps (A) to (D) at least once.

Step (A): The Si-bonded hydrogen atom-containing compound and an alkenyl group-containing alkoxysilane represented by the following formula (10) are subjected to addition reaction in the presence of a catalyst for transition metal hydrosilylation reaction.

(10)

wherein R6 is an alkenyl group having 2 to 10 carbon atoms; and R12, R13 and R14 are each an alkyl group having 1 to 10 carbon atom(s) or an aryl group, where R12, R13 and R14 may structurally be alike or may structurally be different.

Step (B): The Si-bonded hydrogen atom-containing compound is allowed to react with a compound represented by the following formula (11), under acidic conditions.

(11)

wherein R15, R16, R17 and R18 are each an alkyl group having 1 to 10 carbon atom(s) or an aryl group, where R15, R16, R17 and R18 may structurally be alike or may structurally be different.

Step (C): The Si-bonded hydrogen atom-containing compound is allowed to react with a compound having one non-conjugated alkenyl group in the molecule, in the presence of a catalyst for transition metal hydrosilylation reaction.

Step (D): The Si-bonded hydrogen atom-containing compound is allowed to react with a compound represented by the following formula (12), under acidic conditions.

(12)

wherein R20, R21, R22 and R23 are each an alkyl group having 1 to 10 carbon atom(s) or an aryl group, where R20, R21, R22 and R23 may structurally be alike or may structurally be different; R19 and R24 are each a hydrocarbon group having 1 to 30 carbon atom(s), an allyl group, an aryl group, a vinyl group or a group represented by the formula (6).

After any of the above steps has been carried out, other step(s) may also be carried out. For example, the steps (A) and (B) may alternately be carried out at least once, or the steps (A) and (B) may alternately be carried out at least once and thereafter the step (C) may further be carried out. Also, after the step (A), the step (D) may be carried out. The desired compound can be obtained by appropriate combination of the steps (A) to (D).

The Si-bonded hydrogen atom-containing compound may include the compound represented by the formula (11), a Si-bonded hydrogen atom-containing polyorganosiloxane, a Si-bonded hydrogen atom-containing polyolefin, a Si-bonded hydrogen atom-containing polyalkylene oxide, a Si-bonded hydrogen atom-containing polyester, a Si-bonded hydrogen atom-containing polyamide and the compound represented by the formula (1) and in which X in the formula (2) is a hydrogen atom. Of these, the compound represented by the formula (11), a Si-bonded hydrogen atom-containing polyorganosiloxane or the compound represented by the formula (1) and in which X in the formula (2) is a hydrogen atom is much preferred.

The Si-bonded hydrogen atom-containing polyorganopolysiloxane may include linear, branched or cyclic siloxanes. In this polyorganopolysiloxane, an organic group bonded to a silicon atom other than a hydrogen atom may preferably be a monovalent hydrocarbon group. Of the monovalent hydrocarbon group, an alkyl group, an aryl group and an arylalkyl group are preferred. The alkyl group may be exemplified by a methyl group, an ethyl group, a propyl group, a butyl group, a pentyl group, an isopropyl group, an isobutyl group, a cyclopentyl group and a cyclohexyl group. The aryl group may be exemplified by a phenyl group, a naphthyl group, a tolyl group and a xylyl group; and the arylalkyl group by a benzyl group and a phenethyl group.

The compound represented by the formula (1) and in which X in the formula (2) is a hydrogen atom is a multi-branched compound having a Si-bonded hydrogen atom at a branch terminal, i.e., at the outermost shell.

The catalyst for transition metal hydrosilylation reaction used in the steps (A) and (C) may preferably include platinum group transition metal catalysts. Of these, it is further preferable to use a chloroplatinic acid, an alcohol-modified chloroplatinic acid, an olefin complex of platinum or a diketonatoplatinum complex. When the addition reaction is carried out with use of such a platinum group transition metal catalyst, it is preferable to allow a little excessive alkenyl group-containing compound to react therewith in order to allow the Si-bonded hydrogen atoms in the raw material to react completely. Such a little excessive alkenyl group-containing compound may be fractioned and collected by reduced-pressure distillation or the like after the reaction.

The addition reaction carried out in the steps (A) and (C) may be carried out at room temperature or under conditions of heating. It may further be carried out with use of a solvent which does not inhibit the reaction. The solvent may be selected from any existing solvents, which may be exemplified by aliphatic hydrocarbons such as hexane, octane, decane and cyclohexane; aromatic hydrocarbons such as benzene, toluene and xylene; ethers such as diethyl ether, dibutyl ether, tetrahydrofuran and dioxane; ketones such as acetone, methyl ethyl ketone, methyl isobutyl ketone and diisobutyl ketone; esters such as methyl acetate, ethyl acetate, butyl acetate and isobutyl acetate; alcohols such as methanol, ethanol, isopropyl alcohol and butanol; organosiloxane oligomers such as octa-methylcyclotetrasiloxane, decamethylcyclopentasiloxane, hexamethyldisiloxane and octamethyltrisiloxane; and water. Of these, alcohols are preferred.

The alkenyl group-containing alkoxysilane used in the step (A) may be exemplified by vinyltrimethoxysilane, vinyltriethoxysilane, hexenyltrimethoxysilane and hexenyltriethoxysilane. The compound having one non-conjugated alkenyl group in the molecule as used in the step (A) may be exemplified by butane, isobutane, hexane, octane, styrene, α-methylstyrene, vinyltris(trimethylsiloxy)silane and vinylbis(trimethylsiloxy)methoxysilane.

As an acidic substance used for making the acidic conditions in the steps (B) and (D), it may be exemplified by hydrochloric acid, sulfuric acid, a carboxylic acid and a sulfonic acid, or a mixture of any of these.

In the steps (B) and (D), a solvent which does not inhibit the reaction may timely be used. The solvent includes the like ones described previously. In particular, alcohols and water are preferred.

As another example of the production process for producing the compound represented by the formula (1), a method may be exemplified in which the Si-bonded hydrogen atom-containing compound and a compound represented by the following formula (13) are subjected to addition reaction in the presence of a catalyst for transition metal hydrosilylation reaction.

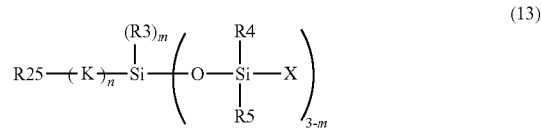

(13)

wherein R25 is an alkenyl group having 2 to 10 carbon atoms; K is a divalent organic group; n is 0 or 1; and other symbols (R3, R4, R5, X and m) represent the same as those described about the formula (2).

As the catalyst for transition metal hydrosilylation reaction may include the catalysts described in the step (A). The reaction may also be carried out with use of a solvent which does not inhibit the reaction, and the solvent includes the like ones described previously.

Charging Member

Figure 1B:
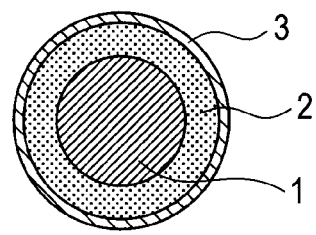
FIG. 1B is a sectional view showing another example of the charging member (roller shaped) of the present invention.
Figure 1C:
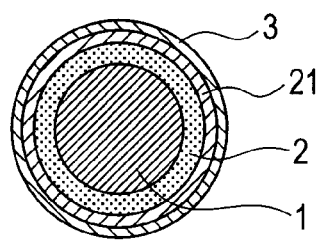
FIG. 1C is a sectional view showing still another example of the charging member (roller shaped) of the present invention.
Figure 1D:
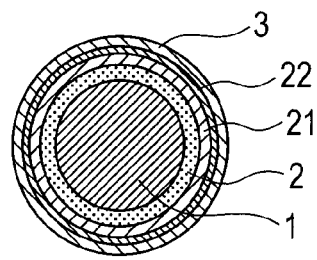
FIG. 1D is a sectional view showing a further example of the charging member (roller shaped) of the present invention.

FIGS. 1A to 1D are schematic sectional views of the charging member according to the present invention. FIGS. 1A to 1D each show a roll-shaped charging member (charging roller). In the following, the charging member is described in detail taking the case of the charging roller. What is shown in FIG. 1A is a charging roller having a conductive support 1 and a surface layer 3. What is shown in FIG. 1B is a charging roller having an elastic layer 2 between the conductive support 1 and the surface layer 3. What is shown in FIG. 1C is a charging roller having an intermediate layer 21 between the elastic layer 2 and the surface layer 3. What is shown in FIG. 1D is a charging roller having intermediate layers 21 and 22 between the elastic layer 2 and the surface layer 3.

The charging roller of the present invention is used in contact with the electrophotographic photosensitive member, and hence may preferably have elasticity. Especially where it is required to have durability or the like, it is recommended to provide the elastic layer as shown in FIGS. 1B to 1D, so as to provide two or more layers on the conductive support 1. The conductive support and the elastic layer or any layers superposed thereon in order (e.g., the elastic layer 2 and surface layer 3 shown in FIG. 1B) may be bonded with an adhesive. In this case, the adhesive may preferably be electrically conductive. In order to make the adhesive electrically conductive, it may have a known conducting agent.

As a binder of the adhesive, it may include thermosetting resins and thermoplastic resins, and any known resins may be used which are of a urethane type, an acrylic type, a polyester type, a polyether type or an epoxy type. As the conducting agent for providing the adhesive with electrical conductivity, it may appropriately be selected from conducting agents described later in detail, any of which may be used alone or in combination of two or more types.

In order to make the photosensitive member well chargeable electrostatically, the charging roller according to the present invention may usually preferably have an electrical resistance of from $1 \times 10^4 \Omega$ or more to $1 \times 10^{10} \Omega$ or less in an environment of 23° C./50% RH.

Figure 2A:
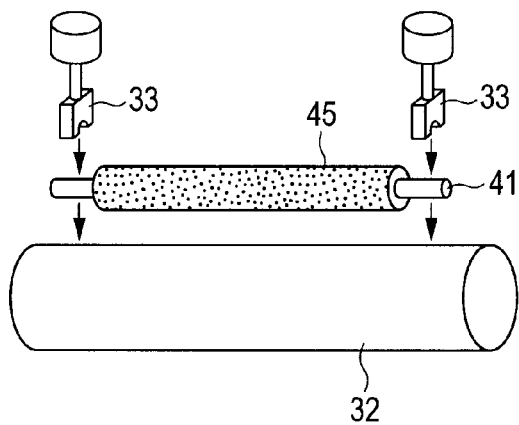
FIG. 2A illustrates how to measure the electrical resistance value of the charging roller of the present invention.
Figure 2B:
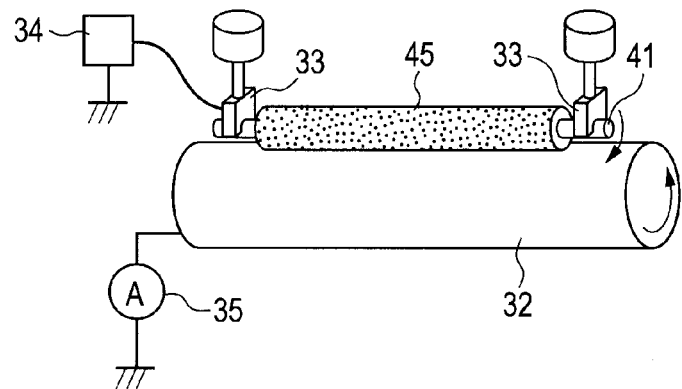
FIG. 2B illustrates how to measure the electrical resistance value of the charging roller of the present invention.

An instrument for measuring the electrical resistance of the charging roller is shown in FIGS. 2A and 2B as an example. By the aid of bearings 33 and 33 through which a load is kept applied to both end portions of a conductive support 41, a charging roller 45 is brought into contact with a columnar metal 32 having the same curvature radius as the photosensitive member, in such a way that the former is in parallel to the latter. In this state, the columnar metal 32 is rotated by means of a motor (not shown) and, while the charging roller 45 kept in contact is follow-up rotated, a DC voltage of −200 V is applied thereto from a stabilized power source 34. Electric current flowing at this point to the charging roller is measured with an ammeter 35, and the electrical resistance of the charging roller is calculated. Here, the load is set to be 4.9 N at each end portion. The columnar metal is 30 mm in diameter, and is rotated at a peripheral speed of 45 mm/second.

From the viewpoint of making the nip width lengthwise uniform to the photosensitive member, the charging roller according to the present invention may preferably be in a shape of what is called a crown shape, in which the roller is thickest at the middle in its lengthwise direction and is thinner as it comes to the both ends in its lengthwise direction. As a crown level, the difference in external diameter between that at the middle and that at positions 90 mm away from the middle may preferably be from 30 μm or more to 200 μm or less.

The charging roller of the present invention may preferably have a ten-point average surface roughness Rzjis (μm) of 2≤Rzjis≤30, and its surface may preferably have a hill-to-dale average distance Sm (μm) of 15≤Sm≤150. Inasmuch as the ten-point average surface roughness Rzjis and hill-to-dale average distance Sm of the charging roller are set within these ranges, the state of contact between the charging roller and the electrophotographic photosensitive member can be made stabler. This is preferable because this makes it easy for the photosensitive member to be uniformly charged. How to measure the ten-point average surface roughness Rzjis and hill-to-dale average distance Sm is shown below.

These are measured according to JIS B 0601-1994 surface roughness standard, and with a surface profile analyzer (trade name: SE-3500; manufactured by Kosaka Laboratory Ltd.). The Rzjis is an average value of values found when it is measured at 6 spots picked up at random on the surface of the charging roller. Also, the Sm is a value found by measuring hill-to-dale distances at ten points each at 6 spots picked up at random on the surface of the charging roller, taking average values at the ten points each as Sm's at the spots of measurement, and averaging the average values of Sm's at the 6 spots as the Sm of the charging member. Here, measurement conditions are as shown below.

Cut-off value: 0.8 mm.
Filter: Gaussian filter.
Standard length: Cut-off×2.
Leveling: Straight line (whole area).
Evaluation length: 8 mm.

In order to control the ten-point average surface roughness and the hill-to-dale average distance within the above ranges, it is preferable that particles of 1 μm or more to 30 μm or less in average particle diameter are added to each layer described later, in particular, the surface layer. As to the particles, they may be exemplified by the conducting agent and insulating particles that are detailed later.

Conductive Support

The conductive support used in the charging member according to the present invention is one having electrical conductivity and having the function to support the surface layer and so forth provided thereon. As a material therefor, it may include, e.g., metals and alloys thereof, such as iron, copper, stainless steel, aluminum and nickel.

Surface Layer

The surface layer used in charging member of the present invention contains the compound represented by the formula (1). Also, the surface layer may preferably be formed in the state the compound represented by the formula (1) is mixed with a binder. When the above compound is mixed in the binder, it may preferably be mixed in an amount of 0.5 part by mass or more, based on 100 parts by mass of the binder. It may much preferably be in an amount of 1 part by mass or more, and further preferably 5 parts by mass or more. It may particularly preferably be in an amount of from 5 parts by mass to 50 parts by mass.

As the binder used in the surface layer, any known binder may be employed. For example, it may include resin, natural rubber or those which have been subjected to vulcanization treatment, and synthetic rubber.

As the resin, resins such as thermosetting resins and thermoplastic resins may be used. In particular, preferred are fluorine resins, polyamide resins, acrylic resins, polyurethane resins, silicone resins and butyral resins. As the synthetic rubber, usable are ethylene-propylene-diene copolymer rubber (EPDM), styrene-butadiene copolymer rubber (SBR), silicone rubbers, urethane rubbers, isoprene rubber (IR), butyl rubber, acrylonitrile-butadiene copolymer rubber (NBR), chloroprene rubber (CR), acrylic rubbers and epichlorohydrin rubber and so forth. Any of these may be used alone, or may be used in the form of a mixture of two or more types, or may be a copolymer. Of these, as the binder used in the surface layer, the resin may preferably be used from the viewpoint of being not contaminating the photosensitive member or any other members and having high release properties.

In the present invention, in order to make the charging member have electrical resistance as described above, the surface layer may preferably have an electrical resistivity of from $1\times10^3$ Ω·cm or more to $1\times10^{15}$ Ω·cm or less in an environment of 23° C./50% RH. By making the surface layer have electrical resistivity within this range, any excess electric current can be kept from flowing through pinholes even where the pinholes have occurred in the photosensitive member.

The volume resistivity of the surface layer is found in the following way. First, from what is in the state of a roller, the surface layer is peeled and cut out in the shape of an oblong card of about 5 mm×5 mm in size. A metal is vacuum-deposited on its both sides to make an electrode and a guard electrode to obtain a sample for measurement. Instead, on an aluminum sheet, a surface layer coating film may be formed by coating, and the metal is vacuum-deposited on the coating film surface to obtain a sample for measurement. To the sample for measurement thus obtained, a voltage of 200 V is applied by using a micro-current meter (trade name: ADVANTEST R8340A Ultra-high Resistance Meter; manufactured by Advantest Co., Ltd.). Then, electric current after 30 seconds is measured, and calculation is made from layer thickness and electrode area to find the volume resistivity.

The volume resistivity of the surface layer may be controlled by using a conducting agent such as ion-conducting agent or an electron-conducting agent. Where carbon black is used as the conducting agent, it may further preferably be used in the form of composite conductive fine particles composed of metal oxide type fine particles coated with carbon black. The carbon black forms structures, and hence has a tendency to have difficulty in making uniformly present with the binder. The use of the carbon black in the form of the composite conductive fine particles composed of fine metal oxide type particles coated with carbon black can make the conducting agent uniformly present in the binder to more facilitate control of the volume resistivity.

The metal oxide type fine particles to be used for this purpose may include particles of a metal oxide or composite metal oxide. Stated specifically, as the metal oxide, it may be exemplified by zinc oxide, tin oxide, indium oxide, titanium oxide (such as titanium dioxide or titanium monoxide), iron oxide, silica, alumina, magnesium oxide and zirconium oxide. As the composite metal oxide, it may be exemplified by strontium titanate, calcium titanate, magnesium titanate, barium titanate and calcium zirconate.

It is preferable for the metal oxide type fine particles to have been surface-treated. For such surface treatment, usable are organosilicon compounds such as alkoxysilanes, fluoroalkylsilanes and polysiloxanes, various coupling agents of a silane type, a titanate type, an aluminate type and a zirconate type, and oligomers or polymeric compounds. Any of these may be used alone or may be used in combination of two or more types.

The surface layer may be incorporated with any other particles as long as the effect of the present invention is not failed. Such other particles may include insulating particles. The surface layer may also be incorporated with a release agent in order to improve the releasability of the surface.

Figure 3A:
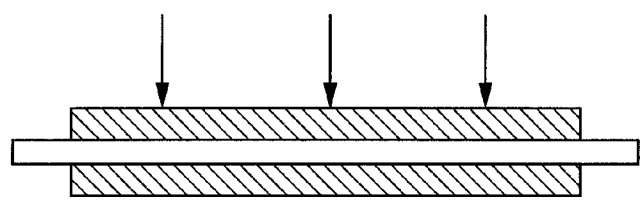
FIG. 3A illustrates at what spots the surface roughness and layer thickness of surface layer of the roller of the present invention are measured.
Figure 3B:
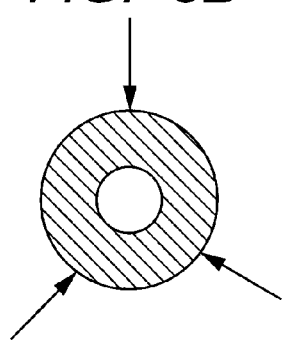
FIG. 3B illustrates at what spots the surface roughness and layer thickness of surface layer of the roller of the present invention are measured.

The surface layer may preferably have a layer thickness of from 0.1 µm or more to 100 µm or less, and much preferably from 1 µm or more to 50 µm or less. The layer thickness of the surface layer may be measured by observing, on an optical microscope or electron microscope, roller sections having been cut out with any sharp-edged tool at positions shown in FIGS. 3A and 3B.

The surface layer may further be one having been surface-treated. Such surface treatment may include surface working treatment making use of ultraviolet rays or electron rays, and surface modification treatment in which a compound is made to adhere to the surface and/or the latter is impregnated with the former.

The surface layer may be formed by a coating method such as electrostatic spray coating or dip coating. Instead, it may be formed by the bonding or covering of a sheet-shaped or tube-shaped layer formed beforehand in a stated layer thickness. Instead, a method may be used in which a material is cured and molded into a stated shape in a mold. In particular, it is preferable to apply a coating material by the coating method to form a coating film.

Elastic Layer

As a material used in the elastic layer, the rubber or resin exemplified previously as the binder for the surface layer. It may preferably include the following: Epichlorohydrin rubber, NBR (nitrile rubber), chloroprene rubber, urethane rubber and silicone rubber, or thermoplastic elastomers such as SBS (styrene-butadiene-styrene block copolymer) and SEBS (styrene-ethylenebutylene-styrene block copolymer). Of these, it is preferable to use a polar rubber because electrical resistance can readily be controlled. In particular, it may include NBR and epichlorohydrin rubber. These have an advantage that the electrical resistance and hardness of the elastic layer can more readily be controlled.

The epichlorohydrin rubber has, in its polymer itself, an electrical conductivity in the medium resistance region, and can exhibit a good electrical conductivity even with its addition in a small quantity. It also can make less non-uniform in electrical resistance depending on positions, and hence may preferably be used as a polymeric elastic material.

The epichlorohydrin rubber may include the following: An epichlorohydrin homopolymer, an epichlorohydrin-ethylene oxide copolymer, an epichlorohydrin-allylglycidyl ether copolymer and an epichlorohydrin-ethylene oxide-allylglycidyl ether terpolymer. Of these, an epichlorohydrin-ethylene oxide-allylglycidyl ether terpolymer may particularly preferably be used because it exhibits stable electrical conductivity in the medium resistance region. The epichlorohydrin-ethylene oxide-allylglycidyl ether terpolymer can control electrical conductivity and workability by controlling its polymerization degrees and compositional ratios.

The elastic layer may be formed of the epichlorohydrin rubber alone, or, containing the epichlorohydrin rubber as a chief component, it may optionally further contain other general-purpose rubber. Such other general-purpose rubber may include the following: EPM (ethylene-propylene rubber), EPDM (ethylene-propylene-diene rubber), NBR (nitrile rubber), chloroprene rubber, natural rubber, isoprene rubber, butadiene rubber, styrene-butadiene rubber, urethane rubber, silicone rubber. The elastic layer may also contain a thermoplastic elastomer such as SBS (styrene-butadiene-styrene block copolymer) or SEBS (styrene-ethylenebutylene-styrene block copolymer). In the case when the above general-purpose rubber is contained, it may be in a content of from 1 part by mass to 50 parts by mass based on 100 parts by mass of the elastic layer material.

The elastic layer may preferably have a volume resistivity of from $10^2$ Ω·cm or more to $10^{10}$ Ω·cm or less as measured in an environment of 23° C./50% RH. In order to control the volume resistivity, a conducting agent such as carbon black, a conductive metal oxide, an alkali metal salt or an ammonium salt may appropriately be added. Where the polar rubber is used in the elastic layer material, it is particularly preferable to use an ammonium salt.

The elastic layer may be incorporated with insulating particles, which are exemplified previously. Also, to the elastic layer, additives such as a softening oil and a plasticizer may be added in order to control its hardness and so forth. The plasticizer and so forth may preferably be compounded in an amount of from 1 part by mass to 30 parts by mass, and much preferably from 3 parts by mass to 20 parts by mass, based on 100 parts by mass of the elastic layer material. As the plasticizer, it is preferable to use a polymeric type. Such a polymeric plasticizer may preferably have a molecular weight of 2,000 or more, and much preferably 4,000 or more. The elastic layer may further appropriately be incorporated with materials which provide it with various functions. Such materials may include as examples thereof an age resistor and a filler.

The elastic layer may preferably have a hardness of 70° or less, and much preferably from 60° or less, as microhardness (MD-1 Model). If it has a microhardness (MD-1 Model) of more than 70°, the nip between the charging member and the photosensitive member may be so small in width that the contact force acting between the charging member and the photosensitive member may localize at a narrow area, resulting in a large contact pressure.

The "microhardness (MD-1 Model)" is the hardness that is measured with ASKER Rubber Microhardness Meter MD-1 Model (trade name; manufactured by Kobunshi Keiki Co., Ltd.). Stated specifically, it is the value measured with the hardness meter, which is brought into contact with the charging member in a 10 N peak hold mode; the charging member having been left to stand for 12 hours or more in an environment of normal temperature and normal humidity (23° C./55% RH).

The volume resistivity of the elastic layer may be measured in the same way as the method of measuring the volume resistivity of the surface layer described above, by using a volume resistivity measuring sample obtained by molding all materials for the elastic layer into a sheet of 1 mm in thickness and vacuum-depositing a metal on its both sides to form an electrode and a guard electrode.

The elastic layer may also be one having been surface-treated. Such surface treatment may include surface working treatment making use of ultraviolet rays or electron rays, and surface modification treatment in which a compound is made to adhere to the surface and/or the latter is impregnated with the former.

The elastic layer may be formed by bonding to or covering on the conductive support a sheet-shaped or tube-shaped layer formed beforehand in a stated layer thickness. It may also be formed by integrally extruding the conductive support and the elastic layer material by means of an extruder having a cross-head.

As a method for dispersing the conducting agent, the insulating particles, the filler and so forth in the elastic layer material, any known method may be used in which, e.g., these are mixed by means of Ribbon blender, Nauta mixer, Henschel mixer, Super mixer, Banbury mixer, a pressure kneader or the like.

Intermediate Layer

At least one intermediate layer may be provided between the elastic layer and the surface layer. The intermediate layer may preferably have a volume resistivity of from $10^2$ Ω·cm or more to $10^{16}$ Ω·cm or less. As long as it has a volume resistivity of $10^{16}$ Ω·cm or less, the charging member can be provided with the function to charge the photosensitive member uniformly. Also, as long as it has a volume resistivity of $10^2$ Ω·cm or more, any leak can be prevented from being caused even where pinholes, scratches or the like have occurred on the surface of the photosensitive member. In order to control the volume resistivity of the intermediate layer, the above conducting agent, insulating particles and so forth may be used. The intermediate layer in the present invention may appropriately be incorporated with the materials exemplified for the elastic layer, besides the various substances to be contained in the surface layer. Like the elastic layer, the intermediate layer may also be subjected to surface working treatment making use of ultraviolet rays or electron rays.

Electrophotographic Apparatus

Figure 4:
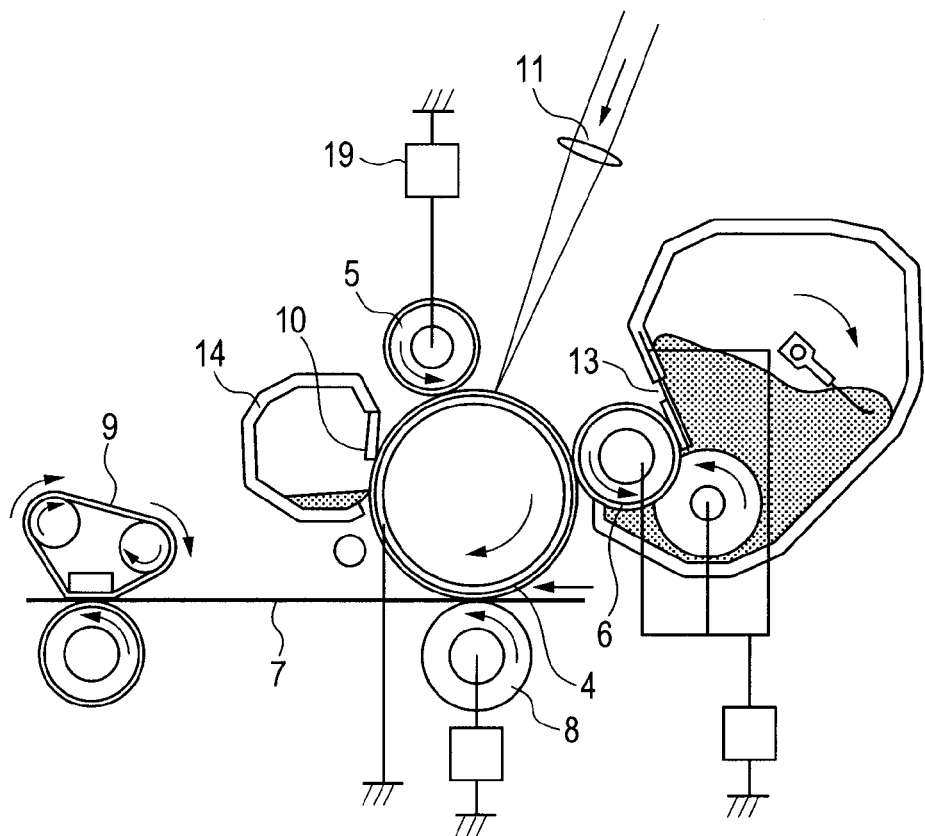
FIG. 4 is a schematic view showing cross-sectionally an embodiment of the electrophotographic apparatus of the present invention.

The construction of an electrophotographic apparatus according to the present invention is schematically shown in FIG. 4. The electrophotographic apparatus is constituted of a photosensitive member, a charging assembly for charging the photosensitive member electrostatically, a latent image forming unit which performs exposure to light, a developing assembly which develops latent images into toner images, a transfer assembly which transfers the toner images to a transfer material, a cleaning unit which collects any transfer residual toner remaining on the photosensitive member, a fixing assembly which fixes the toner images to the transfer material, and so forth.

The photosensitive member, 4, is of a rotating drum type having a photosensitive layer on a conductive substrate. The photosensitive member is rotatingly driven at a stated peripheral speed (process speed) in the direction shown by an arrow.

The charging assembly has a charging roller 5 of a contact system which is provided in contact with the photosensitive member at a stated pressing force. The charging roller 5 is follow-up rotated with the rotation of the photosensitive member, and a stated direct-current voltage is applied thereto from a charging power source to charge the photosensitive member electrostatically to a stated potential. As a latent image forming unit 11 which forms an electrostatic latent image on the photosensitive member, an exposure unit such as a laser beam scanner is used, for example. The photosensitive member thus charged uniformly is exposed to light in accordance with image information to form the electrostatic latent image thereon.

The developing assembly has a contact type developing roller 6 which is provided in proximity to or in contact with the photosensitive member. The electrostatic latent image is rendered visible or developed by reverse development with a toner having electrostatically been processed to have the same polarity as charge polarity of the photosensitive member, to form a toner image thereon.

The transfer assembly has a contact type transfer roller 8. The toner image is transferred from the photosensitive member to a transfer material such as plain paper (the transfer material is transported by a paper feed system having a transport member).

The cleaning unit has a blade type cleaning member 10 and a collecting container 14, and mechanically scrapes off and collects any transfer residual toner remaining on the photosensitive member after transfer. Here, a cleaning-at-development system which collects the transfer residual toner with the developing assembly may be employed so as to omit the cleaning unit.

The fixing assembly, 9, is constituted of a roll or the like to be kept heated, and fixes to the transfer material 7 the toner image having been transferred thereto, which is then delivered out of the machine.

Process Cartridge

A process cartridge (FIG. 5) may also be used, having the photosensitive member, the charging member, the developing assembly, the cleaning unit and so forth which are integrally joined, and being so designed as to be detachably mountable to the main body of the electrophotographic apparatus.

EXAMPLES

The present invention is described below in greater detail by giving specific working examples.

Production Example 1

Production of Compound 1

Into a 100 ml four-necked flask fitted with a stirrer, a thermometer, a reflux condenser and a dropping funnel, 17.75 g of vinyltris(trimethylsiloxy)silane and 0.04 g of a chloroplatinic acid 3% isopropanol solution were introduced, and these were heated to 100° C. with stirring. To the resultant mixture, 3.3 g of 1,1,3,3-tetramethyldisiloxane was slowly dropwise added by using the dropping funnel, so as for the reaction temperature to be kept at 100° C. After its addition made dropwise was completed, the reaction solution formed was heated at 120° C. for 1 hour, which was then cooled to room temperature and thereafter concentrated under reduced pressure to obtain a compound 1.

The compound 1 was a compound having an average molecular formula shown by the following formula (A-1). The compound 1 had a number-average molecular weight in terms of polystyrene, of 788 as measured by gel permeation chromatography. Here, toluene was used as a solvent. What was represented by the formula (2) was in a content of 50%.

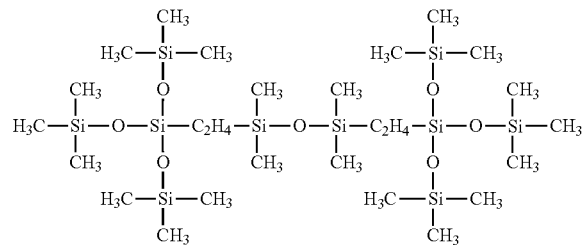

(A-1)

Production Example 2

Production of Compound 2

Into a 200 ml four-necked flask, 121 g of vinyltrimethoxysilane and 0.04 g of a chloroplatinic acid 3% isopropanol solution were introduced, and these were heated to 105° C. with stirring. Then, to the resultant mixture, 50 g of 1,1,3,3-tetramethyldisiloxane was slowly dropwise added by using a dropping funnel, so as for the reaction temperature to be kept at 100-110° C. After its addition made dropwise was completed, the reaction solution formed was heated at 115° C. for 1 hour, which was then cooled, and thereafter the resultant reaction solution was concentrated under reduced pressure, whereupon 158 g of a liquid was obtained. This step is herein a "step 2-1".

Subsequently, into a 1 liter four-necked flask, 150 g of 1,1,3,3-tetramethyldisiloxane, 50 ml of concentrated hydrochloric acid, 100 ml of water and 100 ml of isopropanol were introduced, and these were stirred. Then, to the mixture obtained, 158 g of the liquid obtained above was slowly dropwise added over a period of 1 hour by using the dropping funnel. After its addition made dropwise was completed, the reaction solution formed was stirred for 1 hour. Next, the resultant reaction solution was moved to a separatory funnel to collect the lower layer separately, and thereafter the remaining upper layer liquid was washed three times with 100 ml of water and once with 100 ml of a saturated aqueous sodium hydrogencarbonate solution, followed by drying with anhydrous calcium chloride. The solid matter formed was separated by filtration, and the solution obtained was concentrated under reduced pressure to obtain a compound 2. This step is herein a "step 2-2".

The compound 2 was a compound having an average molecular formula shown by the following formula (A-2). The average molecular weight of the compound 2 was calculated in the same way as Production Example 1 to find that it was 607. What was represented by the formula (2) was in a content of 50%.

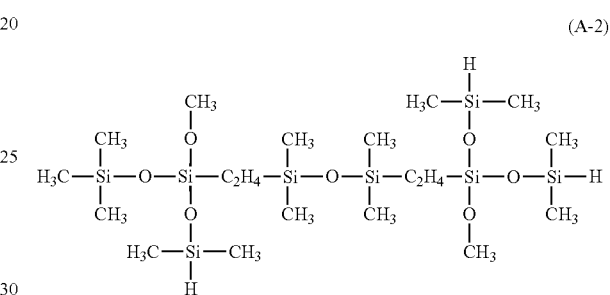

(A-2)

Production Example 3

Production of Compound 3

Into a 300 ml four-necked flask, 182 g of vinyltrimethoxysilane and 0.28 g of a chloroplatinic acid 3% isopropanol solution were introduced, and these were heated to 100° C. with stirring. To the resultant mixture, 100 g of methyltris(dimethylsiloxy)silane was slowly dropwise added by using a dropping funnel, so as for the reaction temperature to be kept at 100° C. After its addition made dropwise was completed, the reaction solution formed was heated at 120° C. for 1 hour, which was then cooled, and thereafter the resultant reaction solution was concentrated under reduced pressure, whereupon 266 g of a liquid was obtained. This was taken as an intermediate 3A.

Next, into a 500 ml four-necked flask, 127 g of 1,1,3,3-tetramethyldisiloxane, 33 ml of concentrated hydrochloric acid, 66 ml of water and 66 ml of isopropanol were introduced, and these were stirred. Then, to the mixture obtained, a 100 g portion of the intermediate 3A obtained above was slowly dropwise added over a period of 1 hour by using a dropping funnel. After its addition made dropwise was completed, the mixture formed was treated in the same way as the "step 2-2" to obtain 156 g of a liquid. This was taken as an intermediate 3B.

Finally, into a 100 ml four-necked flask, 30.0 g of the intermediate 3B obtained above and 0.03 g of a chloroplatinic acid 3% isopropanol solution were introduced, and these were heated to 100° C. with stirring. To the resultant mixture, 24.6 g of hexene was slowly dropwise added by using a dropping funnel, so as for the reaction temperature to be kept at 100° C. After its addition made dropwise was completed, the reaction solution formed was heated at 100° C. for 1 hour, which was then cooled, and thereafter the resultant reaction solution was concentrated under reduced pressure to obtain a compound 3.

The compound 3 was a compound having an average molecular formula shown by the following formula (A-3). Its average molecular weight as above was 1,868. What was represented by the formula (2) was in a content of 75%.

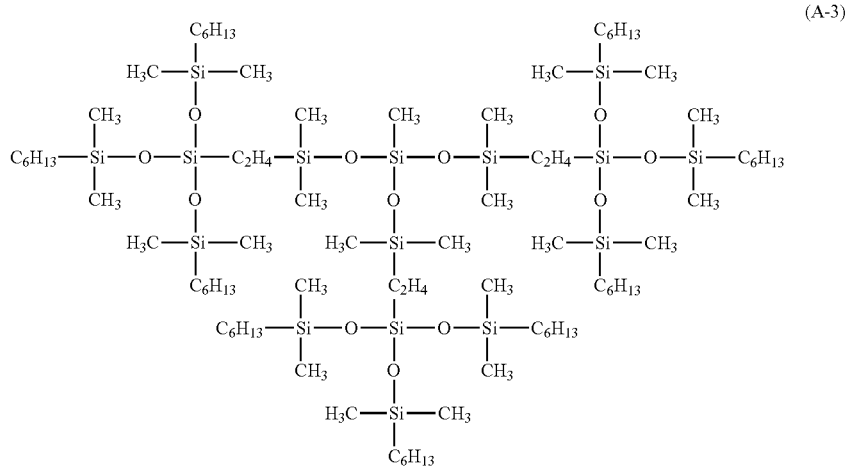

(A-3)

Production Example 4

Production of Compound 4

Into a 100 ml four-necked flask 35.5 g of vinyltris(trimethylsiloxy)silane and 0.04 g of a chloroplatinic acid 3% isopropanol solution were introduced, and these were heated to 100° C. with stirring. To the resultant mixture, 8.2 g of tetrakis(dimethylsiloxy)silane was slowly dropwise added by using the dropping funnel, so as for the reaction temperature to be kept at 100° C. After its addition made dropwise was completed, the reaction solution formed was heated at 120° C. for 1 hour, which was then cooled and thereafter concentrated under reduced pressure to obtain a compound 4.

The compound 4 was a compound having an average molecular formula shown by the following formula (A-4). Its average molecular weight as above was 2,200. What was represented by the formula (2) was in a content of 100%.

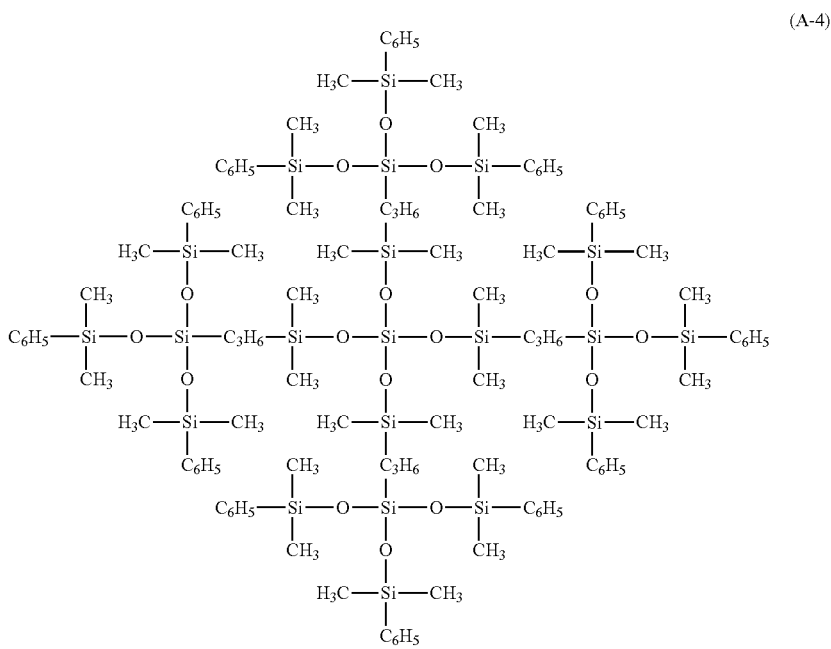

(A-4)

Production Example 5

Production of Compound 5

Into a 100 ml four-necked flask, 49.4 g of vinyltrimethoxysilane and 0.04 g of a chloroplatinic acid 3% isopropanol solution were introduced, and these were heated to 100° C. with stirring. Then, to the resultant mixture, 30.0 g of a polysiloxane represented by the following average molecular formula (5A) was slowly dropwise added by using a dropping funnel, so as for the reaction temperature to be kept at 100° C. After its addition made dropwise was completed, the reaction solution formed was heated at 120° C. for 1 hour, which was then cooled, and thereafter the resultant reaction solution was concentrated under reduced pressure, whereupon 63.1 g of a liquid was obtained. This was taken as an intermediate 5B. Also, this step is herein a "step 5-1".

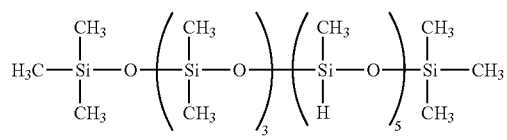
(5A)

Next, into a 200 ml four-necked flask, 60 g of 1,1,3,3-tetramethyldisiloxane, 13 ml of concentrated hydrochloric acid, 27 ml of water and 27 ml of isopropanol were introduced, and these were stirred. Then, to the mixture obtained, 40.0 g of the intermediate 5B obtained above was slowly dropwise added over a period of 1 hour. After its addition made dropwise was completed, the reaction solution formed was stirred at room temperature for 1 hour. The resultant reaction solution was moved to a separatory funnel to collect the lower layer separately, and thereafter the remaining upper layer liquid was washed twice with 20 ml of water and once with 20 ml of a saturated aqueous sodium hydrogencarbonate solution, followed by drying with anhydrous sodium sulfate. The solid matter formed was separated by filtration, and the solution obtained was concentrated under reduced pressure, whereupon 45.4 g of a liquid was obtained. This was taken as an intermediate 5C. Also, this step is herein a "step 5-2".

In the "step 5-1", the formula (5A) polysiloxane was changed for 40 g of the intermediate 5C. Thus, 32 g of a liquid was obtained. This was taken as an intermediate 5D.

Finally, into a 100 ml four-necked flask, 65.5 g of α-methylstyrene and 0.04 g of a chloroplatinic acid 3% isopropanol solution were introduced, and these were heated to 100° C. with stirring. To the resultant mixture, 30.0 g of the intermediate 5D obtained above was slowly dropwise added by using a dropping funnel, so as for the reaction temperature to be kept at 100° C. After its addition made dropwise was completed, the reaction solution formed was heated at 120° C. for 1 hour, which was then cooled, and thereafter the resultant reaction solution was concentrated under reduced pressure to obtain a compound 5. This step is herein a "step 5-3".

The compound 5 was a compound having an average molecular formula shown by the following formula (A-5). Its average molecular weight as above was 5,230. What was represented by the formula (2) was in a content of 22.7%.

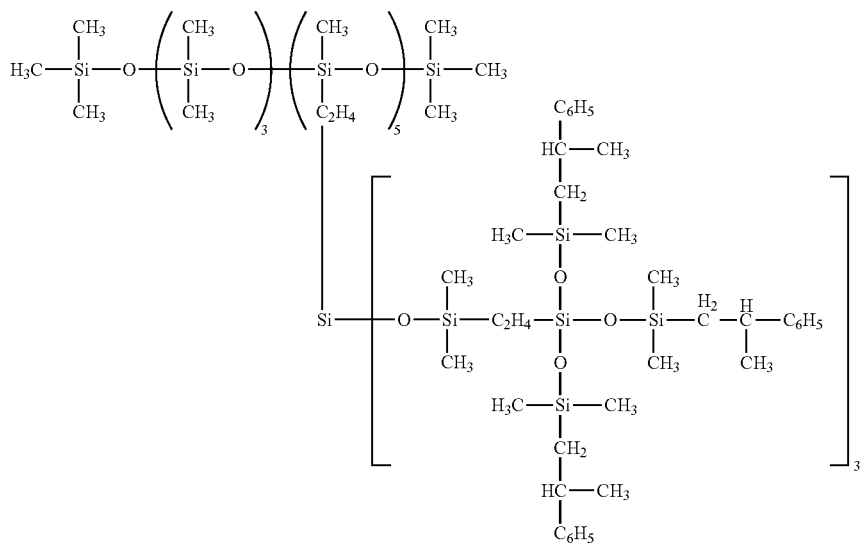
(A-5)

Production Example 6

Production of Compound 6

Treatment was carried out in the same way as the "step 5-1" except that the compound represented by the average molecular formula (5A) was changed for 50.0 g of a compound represented by the following average molecular formula (6A), to obtain 80 g of a liquid. This was taken as an intermediate 6B.

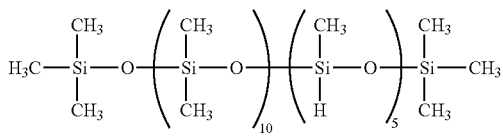

(6A)

Next, treatment was carried out in the same way as the "step 5-2" except that the intermediate 5B was changed for 70.0 g of the intermediate 6B, to obtain 60.4 g of a liquid. This was taken as an intermediate 6C. Then, treatment was carried out in the same way as the "step 5-1" except that the formula (5A) polysiloxane was changed for 50 g of the intermediate 6C. Thus, 80 g of a liquid was obtained. This was taken as an intermediate 6D.

Next, treatment was carried out in the same way as the "step 5-2" except that the intermediate 5B was changed for 70.0 g of intermediate 6D, to obtain 56 g of a liquid. This was taken as an intermediate 6E. Then, treatment was carried out in the same way as the "step 5-1" except that the formula (5A) polysiloxane was changed for 50 g of the intermediate 6E. Thus, 30 g of a liquid was obtained. This was taken as an intermediate 6F.

Finally, into a 100 ml four-necked flask, 60 g of 1,1,3,3-tetramethyl-1,3-divinyldisiloxane, 20 g of acetic acid and 0.06 g of trifluoromethanesulfonic acid were introduced, and these were heated to 50° C. with stirring. To the resultant mixture, 30 g of the intermediate 6F obtained above was slowly dropwise added over a period of 1 hour. After its addition made dropwise was completed, the reaction solution formed was stirred at 60° C. for 5 hours, which was then cooled, and thereafter the resultant reaction solution was moved to a separatory funnel and washed twice with 200 ml of water and once with 100 ml of a saturated aqueous sodium hydrogencarbonate solution, followed by drying with anhydrous magnesium sulfate. The solid matter formed was separated by filtration, and the solution obtained was concentrated under reduced pressure to obtain a compound 6. This step is herein a "step 6-1".

The compound 6 was a compound having an average molecular formula shown by the following formula (A-6). Its average molecular weight as above was 22,780. What was represented by the formula (2) was in a content of 13.9%.

Production Example 7

Production of Compound 7

The procedure of the "step 5-1" was repeated except that the compound represented by the average molecular formula (5A) was changed for 50.0 g of a compound represented by the following average molecular formula (7A), to produce an intermediate 7B.

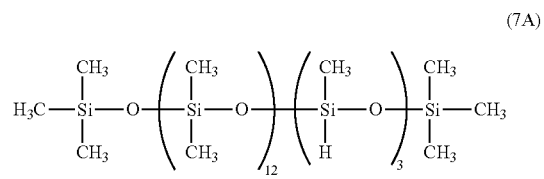

(7A)

Next, treatment was carried out in the same way as the "step 5-2" except that the intermediate 5B was changed for 60.0 g of the intermediate 7B, to obtain 60.0 g of a liquid. This was taken as an intermediate 7C.

The procedure of from the "step 5-1" to the "step 5-2" was thereafter likewise repeated four times. When the respective steps were carried out, they were done with use of, as the compounds to be dropwise added, the intermediates produced in the steps just before them. The compounds used were in the like amounts. Finally, 30 g of an intermediate obtained through the previous steps was slowly dropwise added over a period of 1 hour in the same way as the "step 6-1", and the subsequent treatment was also carried out in the same way to obtain a compound 7.

The compound 7 was a compound having an average molecular formula shown by the following formula (A-7). Its average molecular weight as above was 14,000. What was represented by the formula (2) was in a content of 8.3%.

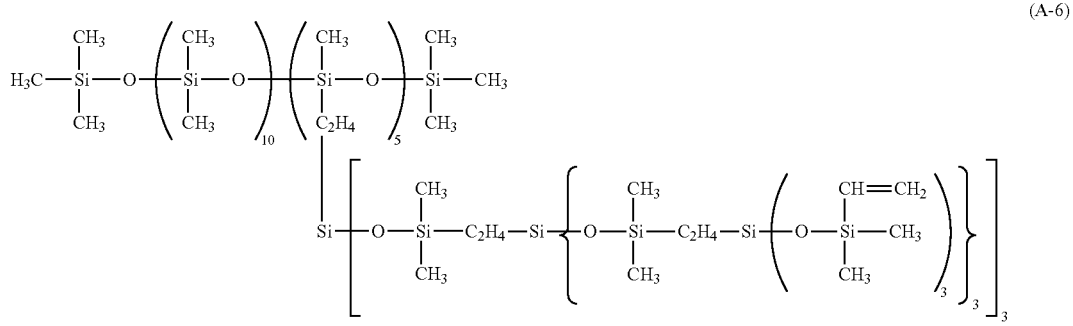

(A-6)

(A-7)

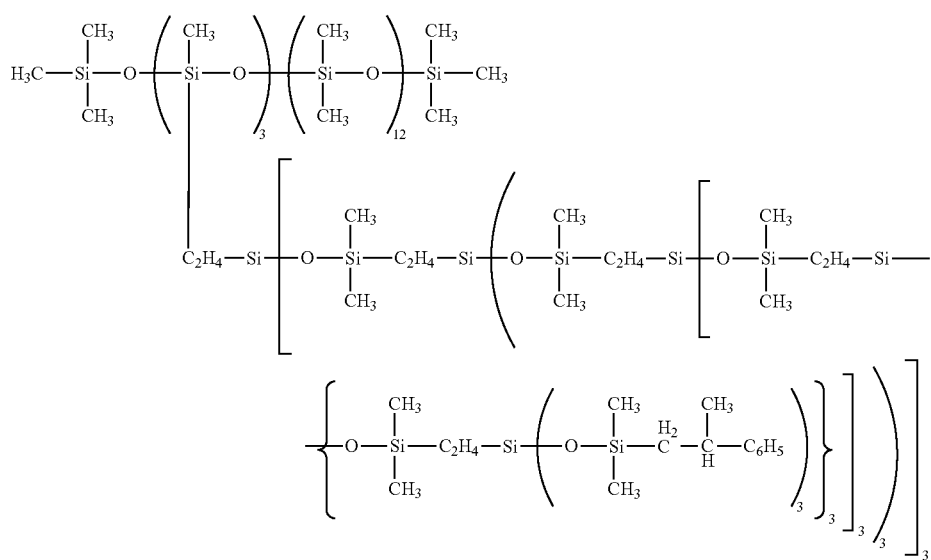

Production Example 8

Production of Compound 8

Into a 200 ml four-necked flask, 107 g of vinyltrimethoxysilane and 0.04 g of a chloroplatinic acid 3% isopropanol solution were introduced, and these were heated to 100° C. with stirring. To the resultant mixture, 49.4 g of tetrakis(dimethylsiloxy)silane was slowly dropwise added by using a dropping funnel, so as for the reaction temperature to be kept at 100° C. After its addition made dropwise was completed, the reaction solution formed was heated at 120° C. for 1 hour, which was then cooled, and thereafter the resultant reaction solution was concentrated under reduced pressure, whereupon 100 g of a liquid was obtained. This was taken as an intermediate 8A. Also, this step is herein a "step 8-1".

Into a 300 ml four-necked flask, 80.6 g of 1,1,3,3-tetramethyldisiloxane, 72.1 g of acetic acid and 0.11 g of trifluoromethanesulfonic acid were introduced, and these were heated to 40° C. with stirring. To the resultant mixture, 76.8 g of the intermediate 8A obtained above was slowly dropwise added over a period of 1 hour. After its addition made dropwise was completed, the reaction solution formed was stirred at 50° C. for 1 hour. The resultant reaction solution was moved to a separatory funnel to collect the lower layer separately, and thereafter the remaining upper layer liquid was washed twice with 50 ml of water and once with 50 ml of a saturated aqueous sodium hydrogencarbonate solution, followed by drying with anhydrous sodium sulfate. The solid matter formed was separated by filtration, and the solution obtained was concentrated under reduced pressure, whereupon 90 g of a liquid was obtained. This was taken as an intermediate 8C. Also, this step is herein a "step 8-2".

Next, treatment was carried out in the same way as the "step 8-1" except that the vinyltrimethoxysilane was used in an amount of 88.9 g and the compound to be dropwise added was changed for 60.5 g of the intermediate 8B, to obtain 85 g of a liquid. This was taken as an intermediate 8B. This step is herein a "step 8-3".

Next, in the "step 8-2", 75.1 g of 1,1,3,3-tetramethyldisiloxane, 53.7 g of acetic acid and 66.9 g of the intermediate 8C were introduced, and these were heated to 50° C. with stirring. To the resultant mixture, 0.08 g of trifluoromethanesulfonic acid was introduced, and thereafter the reaction solution formed was stirred at 50° C. for 1 hour. Except for the above, treatment was carried out in the same way as the "step 8-2" to obtain 77.1 g of a liquid. This was taken as an intermediate 8D. This step is herein a "step 8-4".

Next, treatment was carried out in the same way as the "step 8-3" except that the compound to be dropwise added was changed for 60 g of the intermediate 8D, to obtain 80 g of a liquid. This was taken as an intermediate 8E. This step is herein a "step 8-5".

Next, treatment was carried out in the same way as the "step 8-4" except that the intermediate 8C was changed for 70 g of the intermediate 8E, to obtain 80 g of a liquid. This was taken as an intermediate 8F. This step is herein a "step 8-6".

Finally, into a 100 ml four-necked flask, 50 g of a compound represented by the following average molecular formula (8G):

(8G)

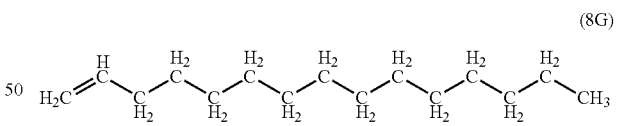

and 0.07 g of a chloroplatinic acid 3% isopropanol solution were introduced, and these were heated to 80° C. with stirring. To the resultant mixture, 15.0 g of the intermediate 8F obtained above was slowly dropwise added by using a dropping funnel, so as for the reaction temperature to be kept at 85° C. After its addition made dropwise was completed, the reaction solution formed was heated at 100° C. for 1 hour, which was then cooled, and thereafter the resultant reaction solution was concentrated under reduced pressure to obtain a compound 8. This step is herein a "step 8-7".

The compound 8 was a compound having an average molecular formula shown by the following formula (A-8). Its average molecular weight as above was 44,000. What was represented by the formula (2) was in a content of 100%.

(A-8)

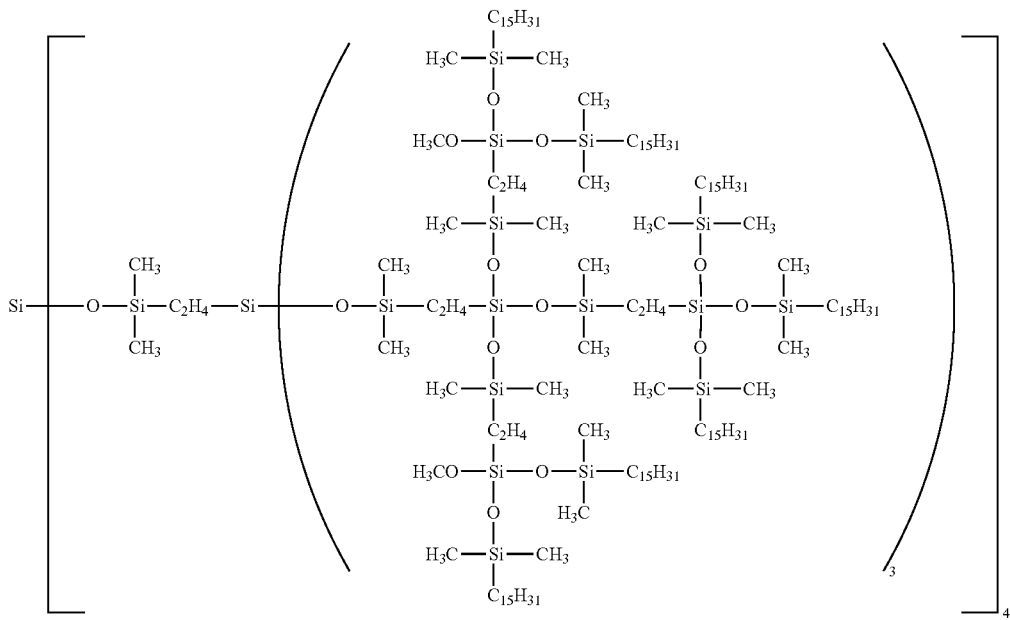

Production Example 9

Production of Compound 9

Into a 100 ml four-necked flask, 60 g of propenyltrimethoxysilane and 0.04 g of a chloroplatinic acid 3% isopropanol solution were introduced, and these were heated to 100° C. with stirring. To the resultant mixture, 65 g of a polysiloxane represented by the following average molecular formula (9A) was slowly dropwise added, except for which the treatment was carried out in the same way as the "step 5-1", whereupon 90 g of a liquid was obtained. This was taken as an intermediate 9B.

(9A)

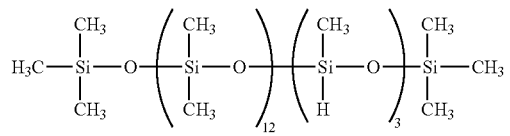

Next, treatment was carried out in the same way as the "step 5-2" except that the intermediate 5B was changed for 70.0 g of the intermediate 9B, to obtain 60.0 g of a liquid. This was taken as an intermediate 9C.

The procedure of from the "step 5-1" to the "step 5-2" was thereafter likewise repeated once. When the respective steps were carried out, they were done with use of, as the compounds to be dropwise added, the intermediates produced in the steps just before them. The compounds used were in the like amounts.

Finally, into a 100 ml four-necked flask, 60 g of propenyltris(trimethylsiloxy)silane and 0.04 g of a chloroplatinic acid 3% isopropanol solution were introduced, and these were heated to 100° C. with stirring. To the resultant mixture, 40 g of an intermediate obtained through the previous steps was slowly dropwise added by using a dropping funnel, so as for the reaction temperature to be kept at 100° C. After its addition made dropwise was completed, the reaction solution formed was heated at 120° C. for 1 hour, which was then cooled, and thereafter the resultant reaction solution was concentrated under reduced pressure to obtain a compound 9. This step is herein a "step 9-1".

The compound 9 was a compound having an average molecular formula shown by the following formula (A-9). Its average molecular weight as above was 10,400. What was represented by the formula (2) was in a content of 8.0%.

(A-9)

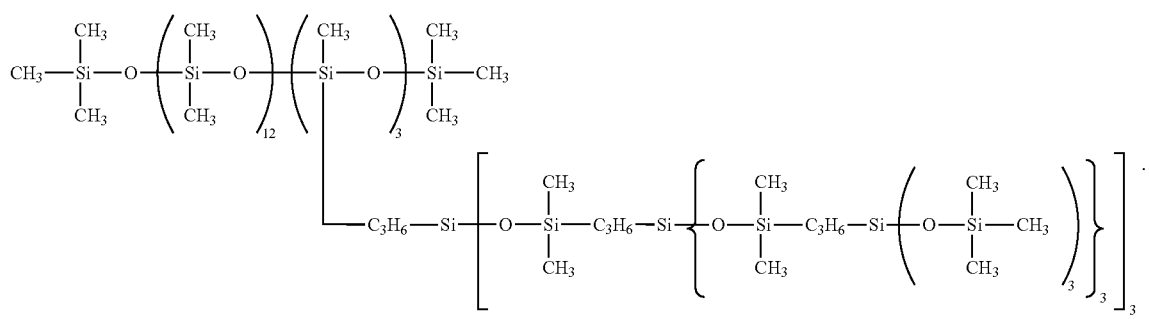

Production Example 10

Production of Compound 10

Into a 100 ml four-necked flask, 40 g of propenyltrimethoxysilane and 0.04 g of a chloroplatinic acid 3% isopropanol solution were introduced, and these were heated to 100° C. with stirring. To the resultant mixture, 50 g of a polysiloxane represented by the following average molecular formula (10A) was slowly dropwise added, except for which the treatment was carried out in the same way as the "step 5-1", thus 60 g of a liquid was obtained. This was taken as an intermediate 10B.

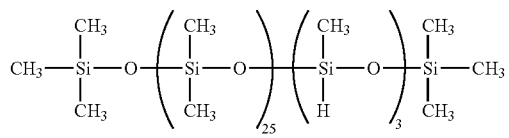
(10A)

Next, treatment was carried out in the same way as the "step 5-2" except that the intermediate 5B was changed for 40.0 g of the intermediate 10B, to obtain 55 g of a liquid. This was taken as an intermediate 10C.

The procedure of from the "step 5-1" to the "step 5-2" was thereafter likewise repeated once. When the respective steps were carried out, they were done with use of, as the compounds to be dropwise added, the intermediates produced in the steps just before them. The compounds used were in the like amounts. Finally, treatment was carried out in the same way as the "step 9-1" to obtain a compound 10.

The compound 10 was a compound having an average molecular formula shown by the following formula (A-10). Its average molecular weight as above was 16,000. What was represented by the formula (2) was in a content of 4.8%.

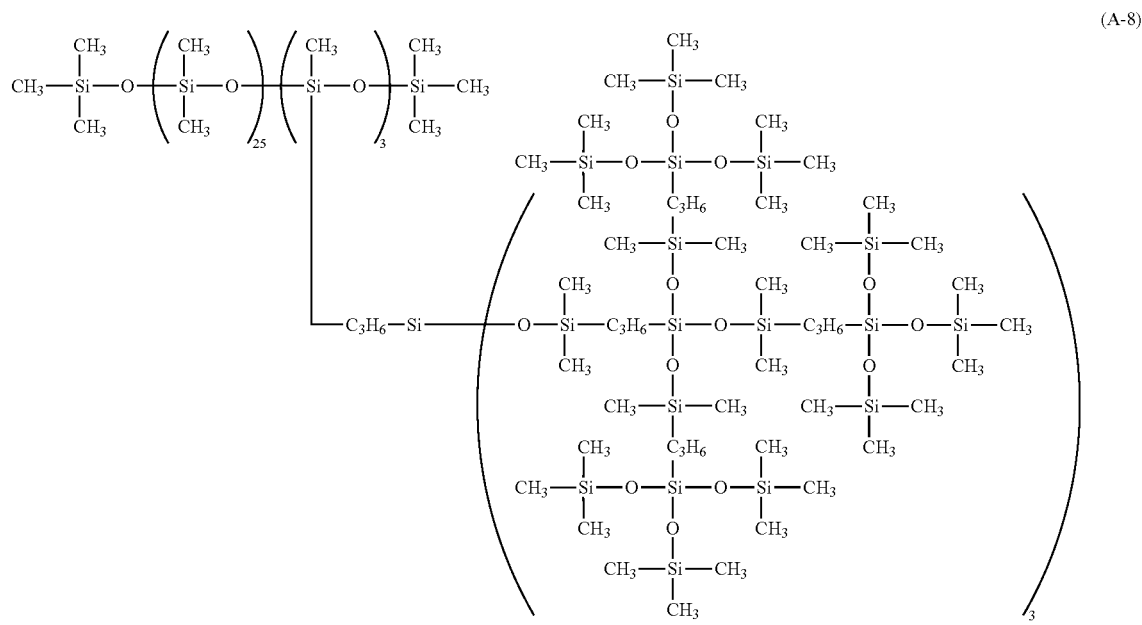
(A-8)

Production Example 11

Production of Compound 11

The procedure of from the "step 8-1" to the "step 8-4" was repeated to obtain 77.1 g of a liquid. This was taken as an intermediate 11D. Finally, treatment was carried out in the same way as the "step 8-7" except that the compound represented by the formula (8G) was changed for a compound represented by the following formula (11E) and that the intermediate 8F was changed for the intermediate 11D, to obtain a compound 11.

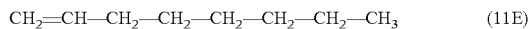
(11E)

The compound 11 was a compound having an average molecular formula shown by the following formula (A-11). Its average molecular weight as above was 9,000. What was represented by the formula (2) was in a content of 100%.

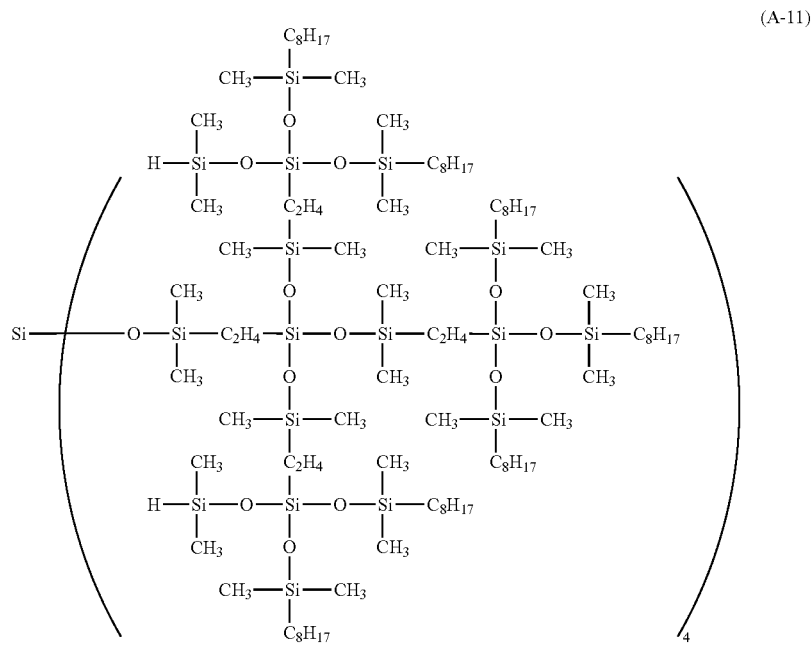
(A-11)

Production Example 12

Production of Compound 12

Treatment was carried out in the same way as the "step 5-1" except that the compound represented by the average molecular formula (5A) was changed for 80.0 g of a compound represented by the following average molecular formula (12A), to obtain 65 g of a liquid. This was taken as an intermediate 12B.

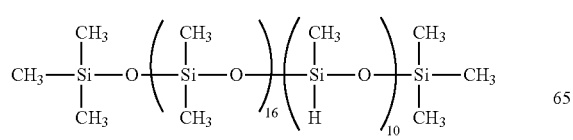
(12A)

Next, treatment was carried out in the same way as the "step 5-2" except that the intermediate 5B was changed for 65 g of the intermediate 12B, to obtain 60 g of a liquid. This was taken as an intermediate 12C. The procedure of from the "step 5-1" to the "step 5-2" as described above was thereafter likewise repeated twice. When the respective steps were operated, they were done with use of, as the compounds to be dropwise added, the intermediates produced in the steps just before them. The compounds used were in the like amounts. Finally, the procedure of the "step 6-1" was repeated except that 30 g of an intermediate obtained through the previous steps was slowly dropwise added over a period of 1 hour, to obtain a compound 12.

The compound 12 was a compound having an average molecular formula shown by the following formula (A-12). Its average molecular weight as above was 45,100. What was represented by the formula (2) was in a content of 17.2%.

sented by the formula (5A) was changed for a compound represented by the following formula (13A), to obtain a compound 13.

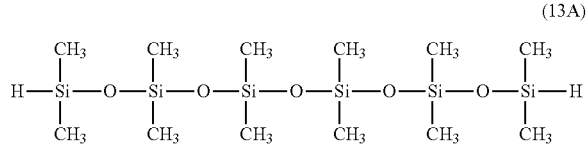

(13A)

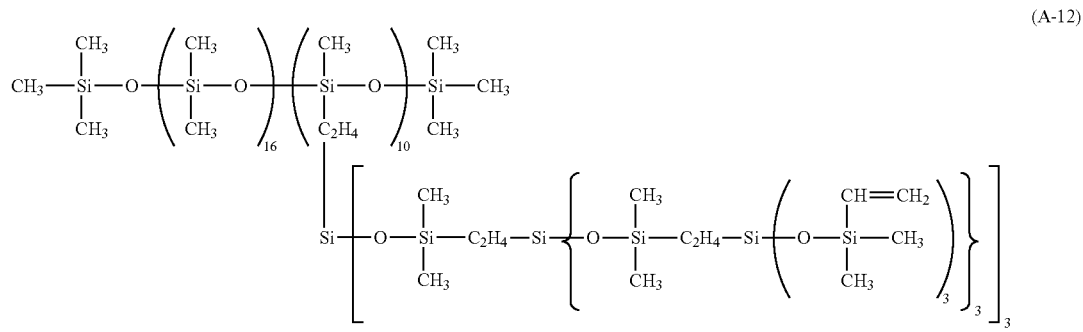

(A-12)

The compound 13 was a compound having an average molecular formula shown by the following formula (A-13). Its average molecular weight as above was 854. What was represented by the formula (2) was in a content of 20%.

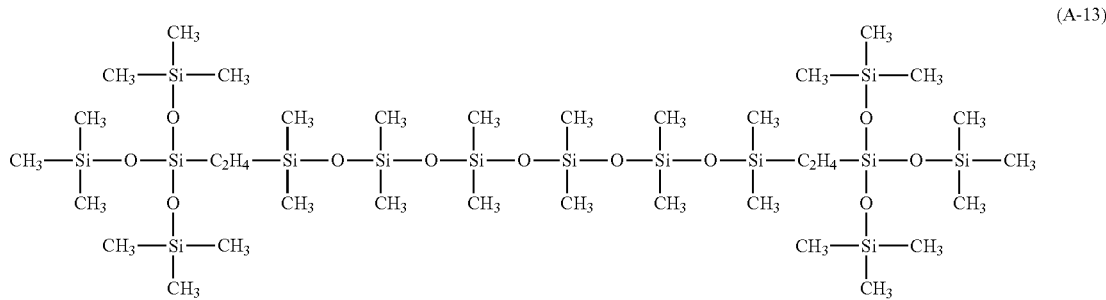

(A-13)

Production Example 13

Production of Compound 13

The procedure of from the "step 5-1" was repeated except that the vinyltrimethoxysilane was changed for 17.75 g of vinyltris(trimethylsiloxy)silane and the compound repre- Production Example 14

Production of Compound 14

Into a 100 ml four-necked flask fitted with a stirrer, a thermometer, a reflux condenser and a dropping funnel, 18 g of a compound represented by the following average molecular formula (14A):

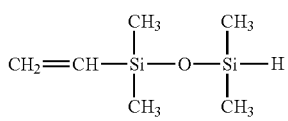
(14A)

and 0.04 g of a chloroplatinic acid 3% isopropanol solution were introduced, and these were heated to 100° C. with stirring. To the resultant mixture, 5 g of 1,1,3,3-tetramethyldisiloxane was slowly dropwise added by using the dropping funnel, so as for the reaction temperature to be kept at 100-110° C. After its addition made dropwise was completed, treatment was carried out in the same way as the "step 5-1" to obtain a compound 14.

The compound 14 was a compound having an average molecular formula shown by the following formula (A-14). Its average molecular weight as above was 454. What was represented by the formula (2) was in a content of 50%.

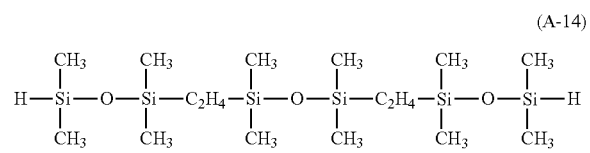
(A-14)

Production Example 15

Production of Compound 15

Into a 300 ml four-necked flask, 400 g of a compound represented by the following average molecular formula (15A) and 0.28 g of a chloroplatinic acid 3% isopropanol solution were introduced, and these were heated to 100° C. with stirring. To the resultant mixture, 100 g of methyltris(dimethylsiloxy)silane was slowly dropwise added by using a dropping funnel, so as for the reaction temperature to be kept at 100° C. After its addition made dropwise was completed, treatment was carried out in the same way as Production Example 14 to obtain a compound 15.

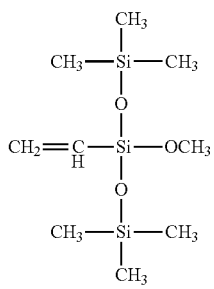
(15A)

The compound 15 was a compound having an average molecular formula shown by the following formula (A-15). Its average molecular weight as above was 1,130. What was represented by the formula (2) was in a content of 75%.

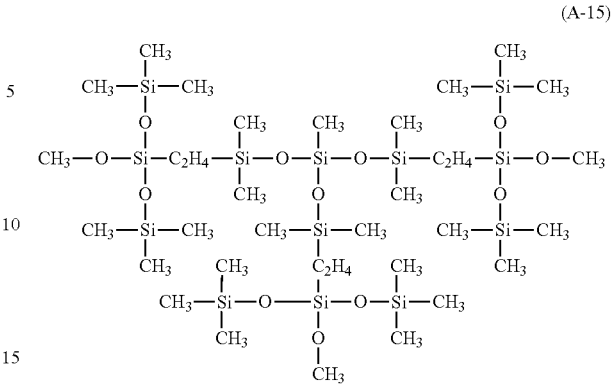
(A-15)

Production Example 16

Production of Compound 16

Into a 100 ml four-necked flask, 30 g of the compound represented by the average molecular formula (15A) and 0.04 g of a chloroplatinic acid 3% isopropanol solution were introduced, and these were heated to 100° C. with stirring. To the resultant mixture, 8.2 g of tetrakis(dimethylsiloxy)silane was slowly dropwise added by using a dropping funnel, so as for the reaction temperature to be kept at 100° C., except for which the procedure of Production Example 15 was repeated to obtain a compound 16.

The compound 16 was a compound having an average molecular formula shown by the following formula (A-16). Its average molecular weight as above was 1,430. What was represented by the formula (2) was in a content of 100%.

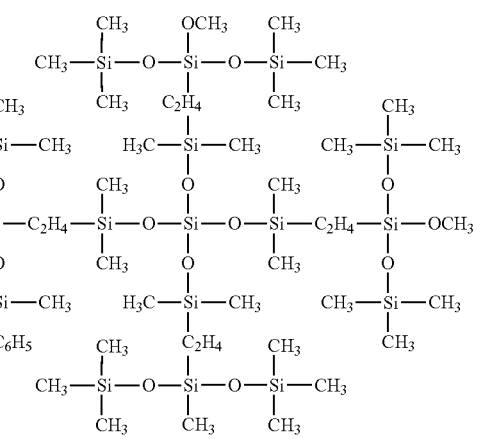
(A-16)

Production Example 17

Production of Compound 17

Into a 200 ml four-necked flask, 20 g of a compound represented by the following average molecular formula (17A) and 7.5 mg of a divinylhexamethyldisiloxane solution of a platinum divinyltetramethyldisiloxane complex (platinum concentration in solution: 4% by mass) were fed, and these were heated to 140° C. with stirring. Then, to the resultant mixture, 15 g of a compound represented by the following average molecular formula (17B) was slowly dropwise added by using a dropping funnel. After its addition made dropwise was completed, the reaction solution formed was heated at 140° C. for 2 hours, which was then cooled to obtain a compound 17.

The compound 17 was a compound having an average molecular formula shown by the following formula (A-17). Its average molecular weight as above was 12,400. What was represented by the formula (2) was in a content of 75%.

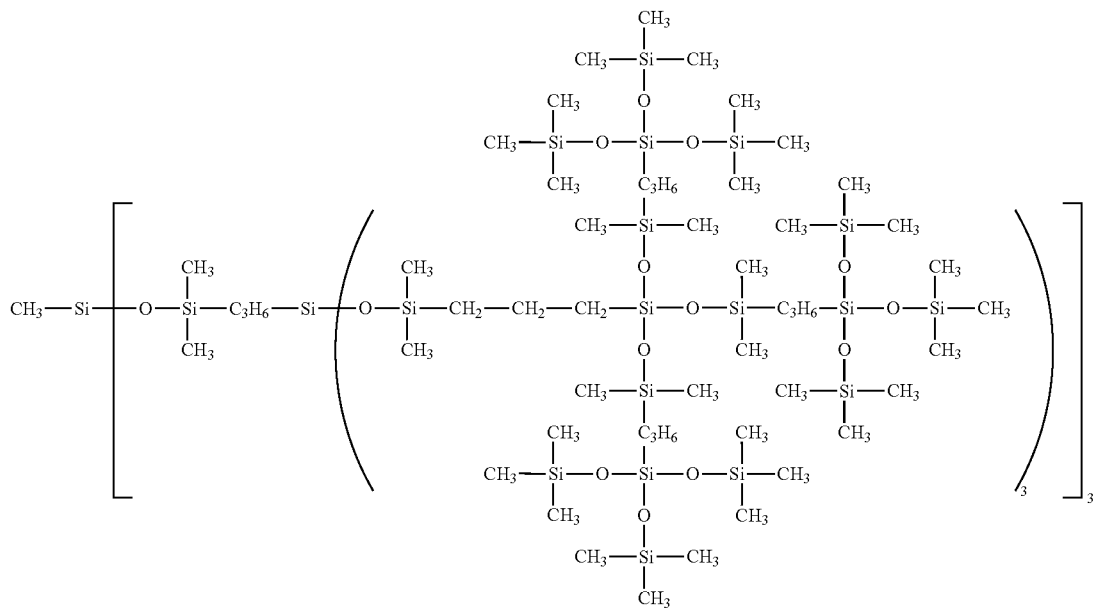

(A-17)

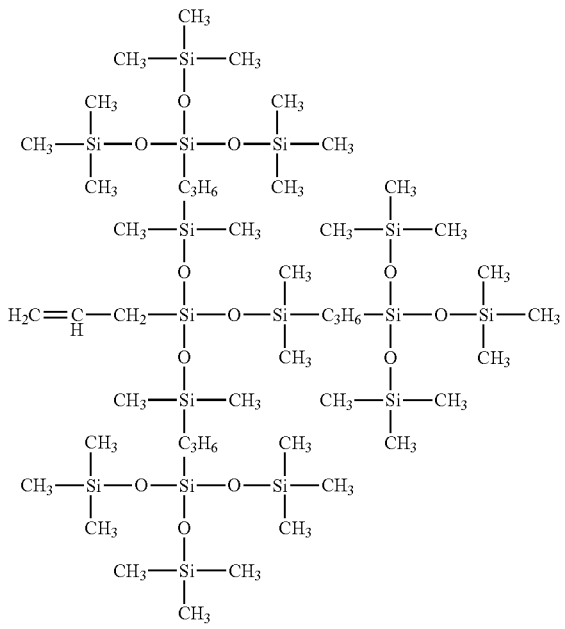

(17A)

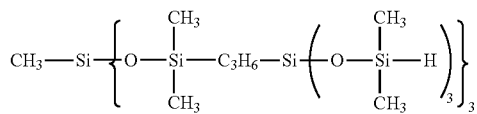

(17B)

Production Example 18

Production of Compound 18

Into a 200 ml four-necked flask, 150 g of vinyltrimethoxysilane and 0.04 g of a chloroplatinic acid 3% isopropanol solution were introduced, and these were heated to 100° C. with stirring. To the resultant mixture, 49.4 g of tetrakis(dimethylsiloxy)silane was slowly dropwise added so as for the reaction temperature to be kept at 100° C. After its addition made dropwise was completed, the reaction solution formed was heated at 120° C. for 1 hour, which was then cooled, and thereafter the resultant reaction solution was concentrated under reduced pressure, whereupon 180 g of a liquid was obtained. This was taken as an intermediate 18A.

Next, treatment was carried out in the same way as the "step 8-2" except that the intermediate 8A was changed for 80 g of the intermediate 18A, to obtain 120 g of a liquid. This was taken as an intermediate 18B.

Next, treatment was carried out in the same way as the "step 8-3" except that the compound to be dropwise added was changed for 60 g of the intermediate 18B, to obtain 134 g of a liquid. This was taken as an intermediate 18C.

Next, treatment was carried out in the same way as the "step 8-4" except that the intermediate 8C was changed for 67 g of the intermediate 18C, to obtain 78 g of a liquid. This was taken as an intermediate 18D.

Next, treatment was carried out in the same way as the "step 8-5" except that the intermediate 8D was changed for 60 g of the intermediate 18D, to obtain 120 g of a liquid. This was taken as an intermediate 18E.

Next, treatment was carried out in the same way as the "step 8-6" except that the intermediate 8E was changed for 67 g of the intermediate 18E, to obtain 80 g of a liquid. This was taken as an intermediate 18F.

Next, treatment was carried out in the same way as the "step 8-3" except that the intermediate 8B was changed for 50 g of the intermediate 18F, to obtain 90 g of a liquid. This was taken as an intermediate 18G.

Next, treatment was carried out in the same way as the "step 8-2" except that the intermediate 8A was changed for 80 g of the intermediate 18G, to obtain 120 g of a liquid. This was taken as an intermediate 18H.

Finally, the procedure of the "step 8-7" was repeated except that the intermediate 8F was changed for 35.5 g of vinyltris(trimethylsiloxy)silane, to obtain a compound 18.

The compound 18 was a compound having an average molecular formula shown by the following formula (A-18). Its average molecular weight as above was 57,300. What was represented by the formula (2) was in a content of 100%.

was carried out in the same way as the "step 5-1" to obtain 100 g of a liquid. This was taken as an intermediate 19B. This step is herein "step 19-1".

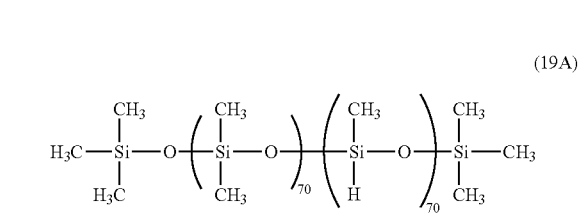

Next, treatment was carried out in the same way as the "step 5-2" except that the intermediate 5B was changed for 80 g of the intermediate 19B, to obtain 60 g of a liquid. This was taken as an intermediate 19C.

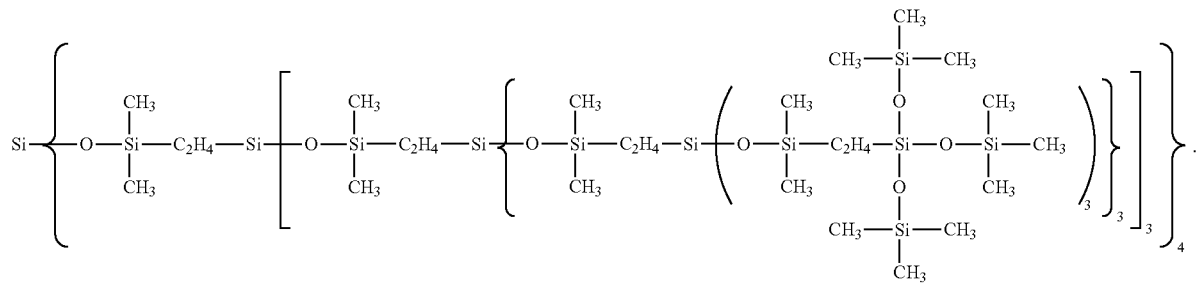

Production Example 19

Production of Compound 19

Into a 200 ml four-necked flask, 50 g of vinyltrimethoxysilane and 0.04 g of a chloroplatinic acid 3% isopropanol solution were introduced, and these were heated to 100° C. with stirring. To the resultant mixture, 50 g of a polysiloxane represented by the following average molecular formula (19A) was dropwise added. Except for the above, treatment Finally, the compound represented by the average molecular formula (8G) was changed for 60 g of vinyltris(trimethylsiloxy)silane and the intermediate 8F was changed for 60 g of the intermediate 19C. Also, the reaction temperature was changed to 100° C. and the heating of the reaction solution was changed to heating at 120° C. for 1 hour. Except for the above, treatment was carried out in the same way as the "step 8-7" to obtain a compound 19. This step is herein "step 19-2".

The compound 19 was a compound having an average molecular formula shown by the following formula (A-19). Its average molecular weight as above was 98,700. What was represented by the formula (2) was in a content of 24.5%.

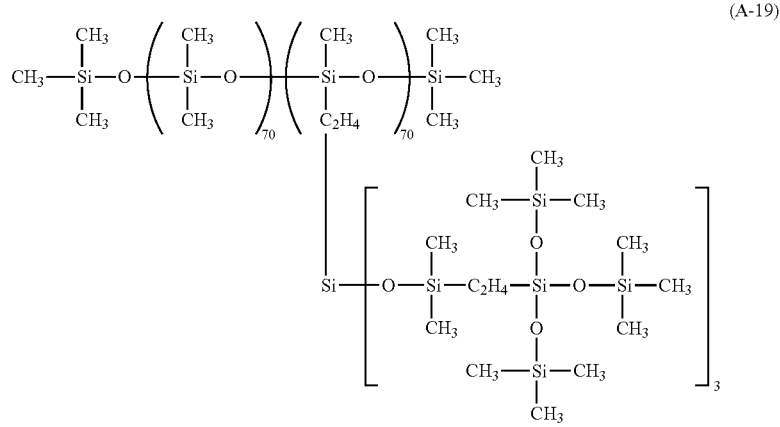

Production Example 20

Production of Compound 20

Treatment was carried out in the same way as the "step 19-1" except that the compound represented by the average molecular formula (19A) was changed for 80.0 g of a compound represented by the following average molecular formula (20A), to obtain 100 g of a liquid. This was taken as an intermediate 20B.

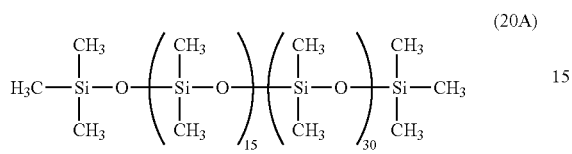
(20A)

Next, treatment was carried out in the same way as the "step 5-2" except that the intermediate 5B was changed for 80 g of the intermediate 20B, to obtain 60 g of a liquid. This was taken as an intermediate 20C. Finally, the procedure of the "step 19-2" was repeated except that the intermediate 19C was changed for 60 g of the intermediate 20C, to obtain a compound 20.

The compound 20 was a compound having an average molecular formula shown by the following formula (A-20). Its average molecular weight as above was 41,300. What was represented by the formula (2) was in a content of 31.3%.

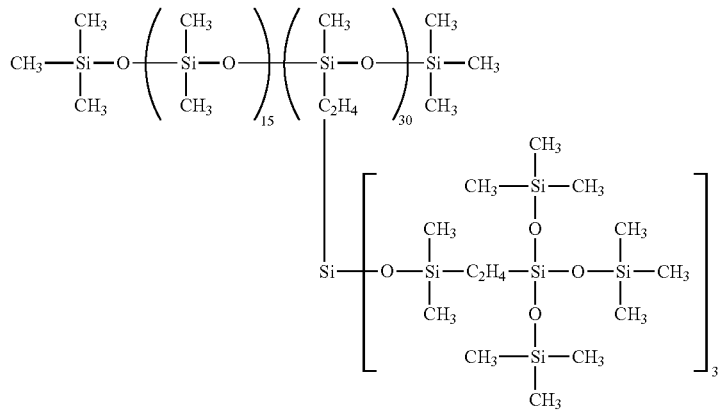
(A-20)

Production Example 21

Production of Compound 21

Into a 200 ml four-necked flask fitted with a stirrer, a thermometer, a reflux condenser and a dropping funnel, 27.0 g of a compound represented by the following average molecular formula (21A) and 7.5 mg of a divinylhexamethyldisiloxane solution of a platinum divinyltetramethyldisiloxane complex (platinum concentration in solution: 4% by mass) were fed, and these were heated to 140° C. with stirring. Then, to the resultant mixture, 9 g of a compound represented by the following average molecular formula (21B) was slowly dropwise added over a period of 30 minutes. After its addition made dropwise was completed, the reaction solution formed was heated at 140° C. for 2 hours, which was then cooled to obtain a compound 21.

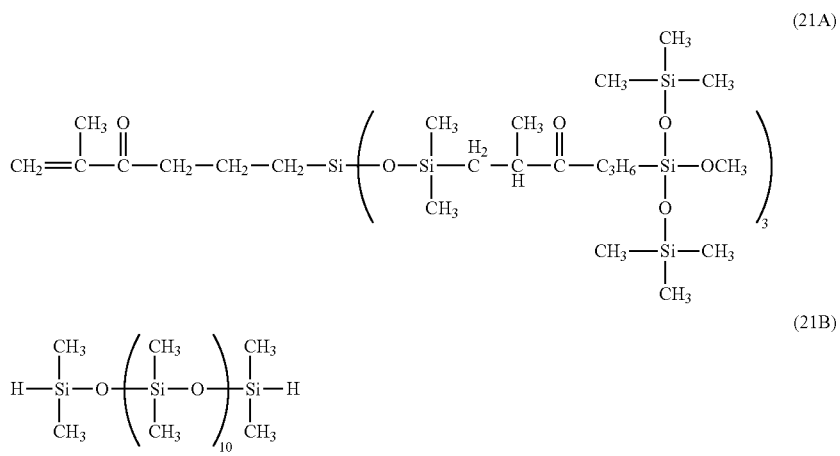

(21A)

(21B)

The compound 21 was a compound having an average molecular formula shown by the following formula (A-21). Its average molecular weight as above was 3,000. What was represented by the formula (2) was in a content of 9.1%.

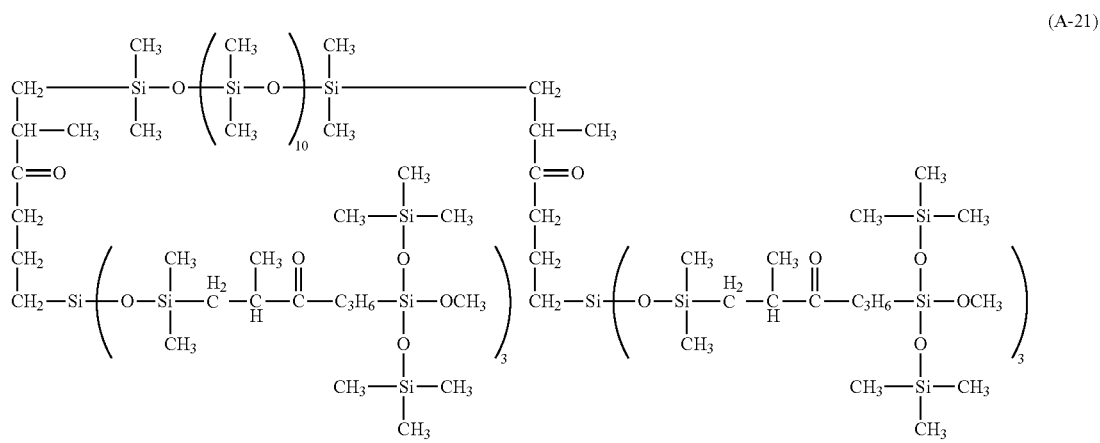

(A-21)

Production Example 22

Production of Compound 22

Treatment was carried out in the same way as the "step 19-1" except that the compound represented by the average molecular formula (19A) was changed for a compound represented by the following average molecular formula (22A), to obtain 100 g of a liquid. This was taken as an intermediate 22B.

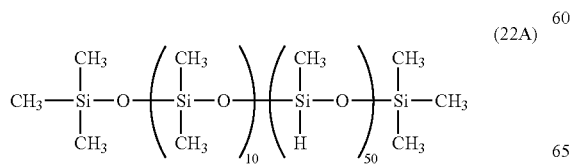

(22A)

Next, treatment was carried out in the same way as the "step 5-2" except that the intermediate 5B was changed for 80 g of the intermediate 22B, to obtain 60 g of a liquid. This was taken as an intermediate 22C. Finally, treatment was carried out in the same way as the "step 19-2" except that the intermediate 19C was changed for the intermediate 22C, to obtain a compound 22.

The compound 22 was a compound having an average molecular formula shown by the following formula (A-22). Its average molecular weight as above was 70,000. What was represented by the formula (2) was in a content of 39.7%.

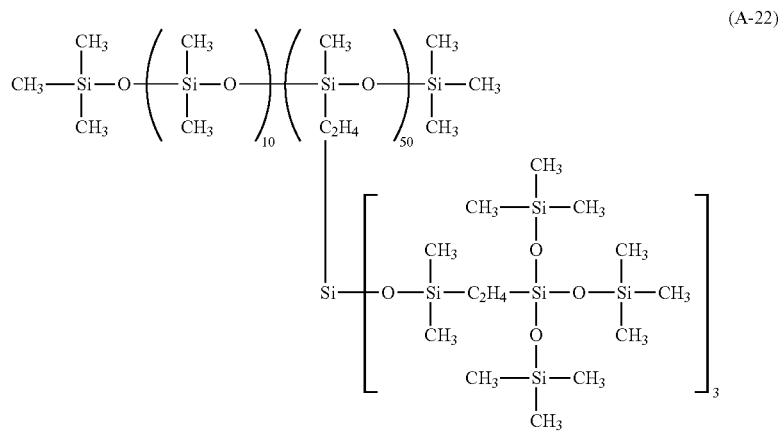

(A-22)

Production Example 23

Production of Compound 23

Into a 200 ml four-necked flask, 21.0 g of a compound represented by the following average molecular formula (23A) and 7.5 mg of a divinylhexamethyldisiloxane solution of a platinum divinyltetramethyldisiloxane complex (platinum concentration in solution: 4% by mass) were fed, and these were heated to 140° C. with stirring. Then, to the resultant mixture, 18 g of a compound represented by the following average molecular formula (23B) was slowly dropwise added by using a dropping funnel. After its addition made dropwise was completed, the reaction solution formed was heated at 140° C. for 2 hours, which was then cooled to obtain a compound 23.

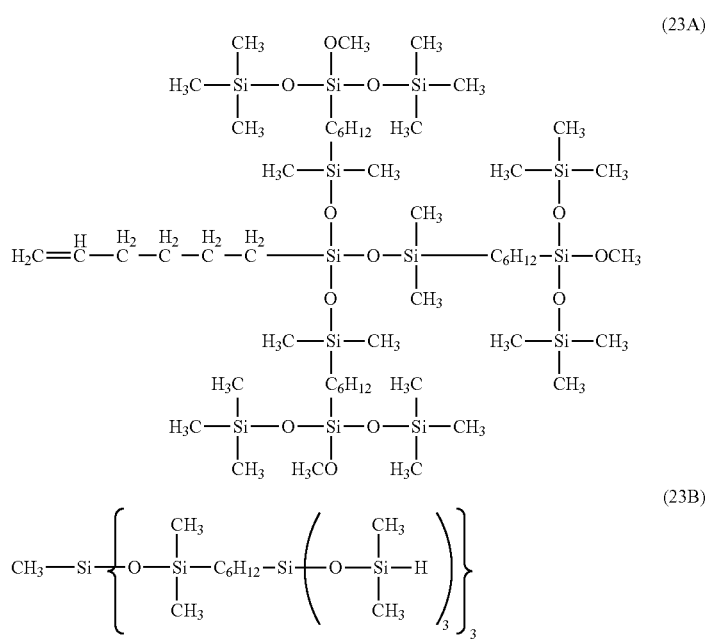

(23A)

(23B)

The compound 23 was a compound having an average molecular formula shown by the following formula (A-23). Its average molecular weight as above was 9,500. What was represented by the formula (2) was in a content of 75%.

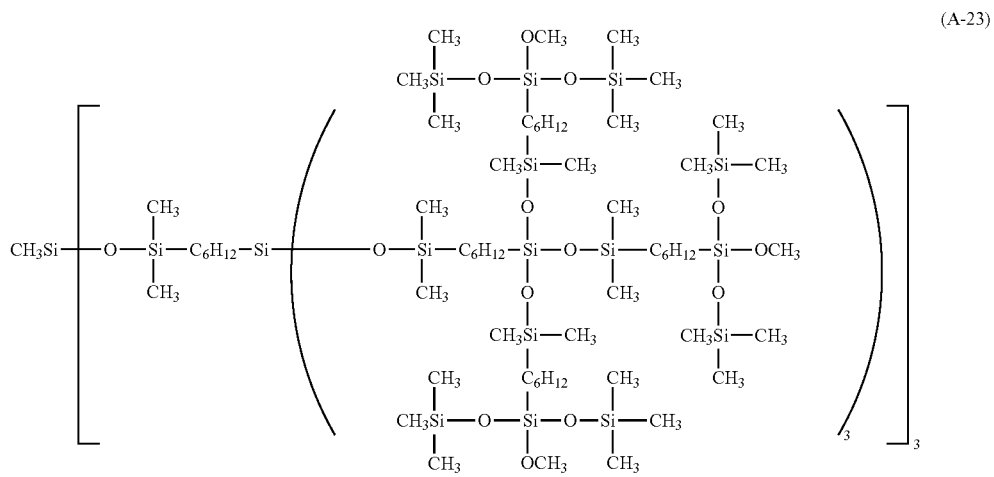

(A-23)

Production Example 24

Production of Compound 24

The procedure of Production Example 20 was repeated except that the vinyltris(trimethylsiloxy)silane was changed for a compound represented by the following average molecular formula (24A), to obtain a compound 24.

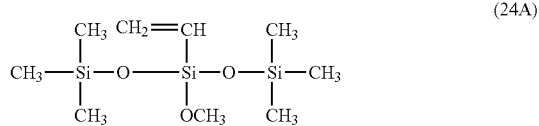

(24A)

The compound 24 was a compound having an average molecular formula shown by the following formula (A-24). Its average molecular weight as above was 30,000. What was represented by the formula (2) was in a content of 31.3%.

Production Example 25

Production of Compound 25

Into a 200 ml four-necked flask, 121 g of a compound represented by the following average molecular formula (25A) and 0.04 g of a chloroplatinic acid 3% isopropanol solution were introduced, and these were heated to 105° C. with stirring. Then, to the resultant mixture, 50 g of 1,1,3,3-tetramethyldisiloxane was slowly dropwise added by using a dropping funnel, so as for the reaction temperature to be kept at 100-110° C. After its addition made dropwise was completed, the reaction solution formed was heated at 115° C. for 1 hour, which was then cooled, and thereafter the resultant reaction solution was concentrated under reduced pressure, whereupon 158 g of a liquid was obtained. This was taken as an intermediate 25B.

Next, treatment was carried out in the same way as the "step 5-2" except that the intermediate 5B was changed for 40.0 g of the intermediate 25B, to obtain 60 g of a liquid. This

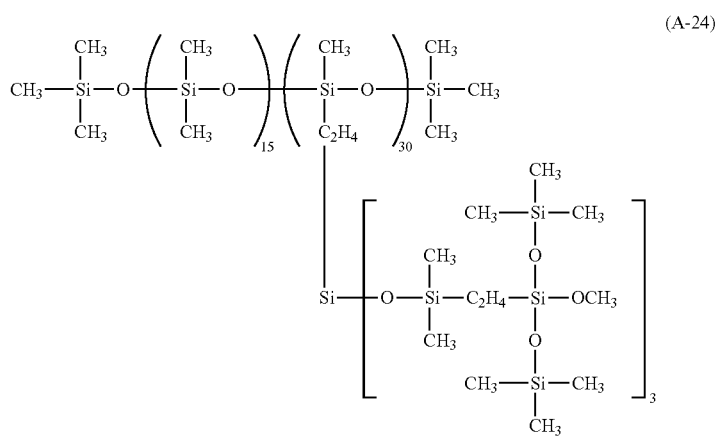

(A-24)

was taken as an intermediate 25C. Finally, treatment was carried out in the same way as the "step 19-2" except that the intermediate 19C was changed for the intermediate 25C, to obtain a compound 25.

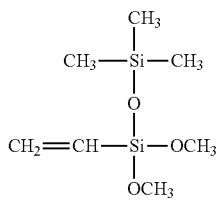
(25A)

The compound 25 was a compound having an average molecular formula shown by the following formula (A-25). Its average molecular weight as above was 2,000. What was represented by the formula (2) was in a content of 50%.

Production Example 26

Production of Compound 26

Into a 200 ml four-necked flask fitted with a stirrer, a thermometer, a reflux condenser and a dropping funnel, 50 g of a compound represented by the following average molecular formula (26A) and 7.5 mg of a divinylhexamethyldisiloxane solution of a platinum divinyltetramethyldisiloxane complex (platinum concentration in solution: 4% by mass) were fed, and these were heated to 140° C. with stirring. Then, to the resultant mixture, 2.59 g of a compound represented by the following average molecular formula (26B) was slowly

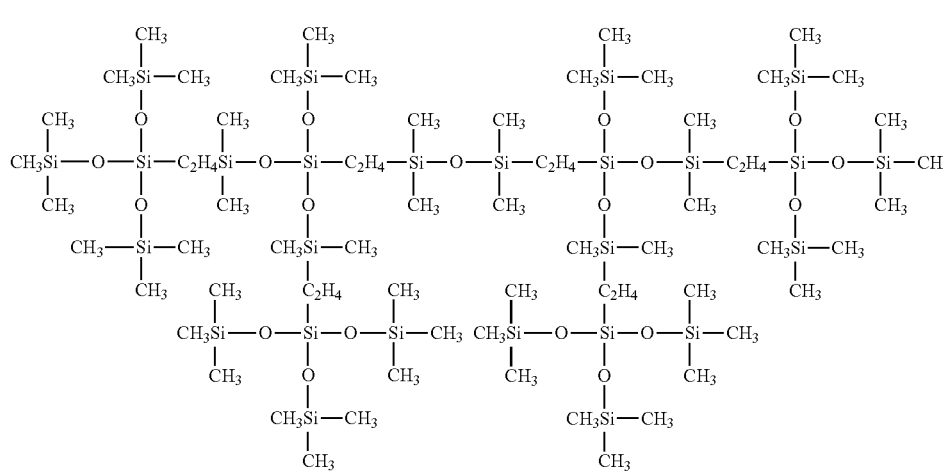
(A25)

dropwise added by using the dropping funnel. After its addition made dropwise was completed, the reaction solution formed was heated at 140° C. for 2 hours, which was then cooled to obtain a compound 26.

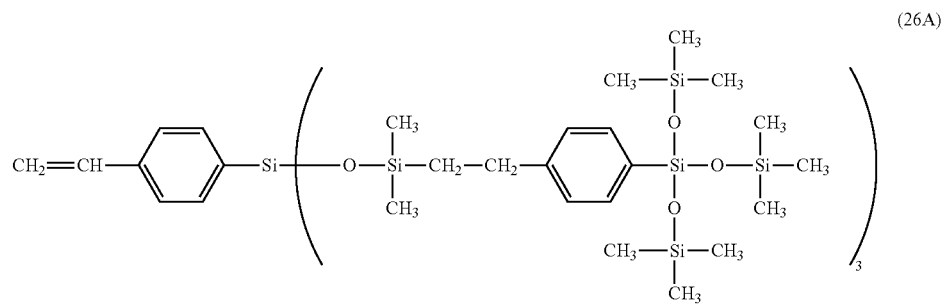
(26A)

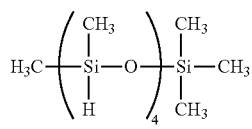
(26B)

The compound 26 was a compound having an average molecular formula shown by the following formula (A-26). Its average molecular weight as above was 5,500. What was represented by the formula (2) was in a content of 33%.

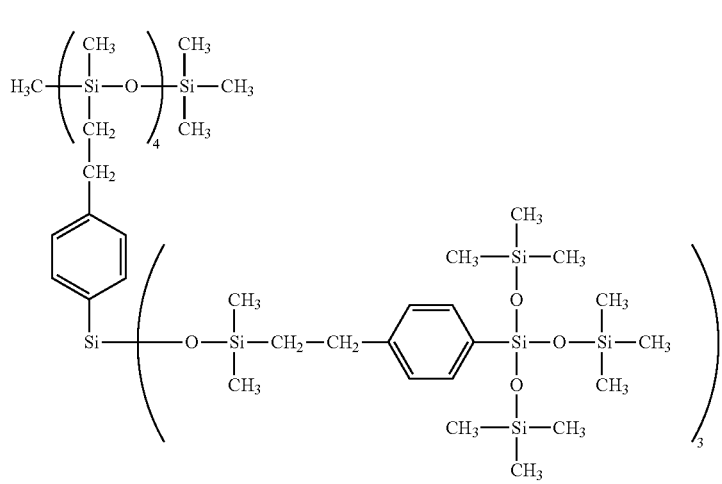
(A-26)

Production Example 27

Production of Compound 27

Treatment was carried out in the same way as the "step 8-1" except that the vinyltrimethoxysilane was used in an amount of 88.9 g and the compound to be dropwise added was changed for 30.0 g of the compound represented by the average molecular formula (26B), to obtain 100 g of a liquid. This was taken as an intermediate 27A.

Next, treatment was carried out in the same way as the "step 5-2" except that the intermediate 5B was changed for 50 g of the intermediate 27A, to obtain 60 g of a liquid. This was taken as an intermediate 27B. Finally, treatment was carried out in the same way as the "step 19-2" except that the intermediate 19C was changed for the intermediate 27B, to obtain a compound 27.

The compound 27 was a compound having an average molecular formula shown by the following formula (A-27). Its average molecular weight as above was 3,900. What was represented by the formula (2) was in a content of 33%.

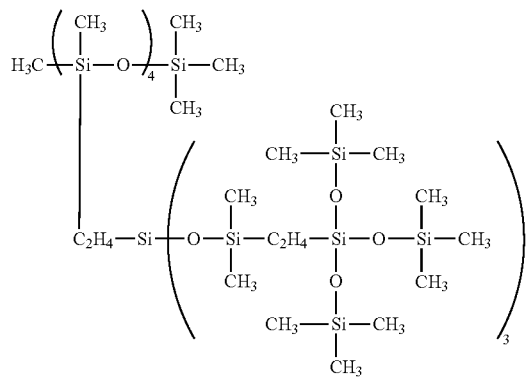
(A-27)

Production Example 28

Production of Compound 28

Treatment was carried out in the same way as the "step 5-1" except that the compound represented by the average molecular formula (5A) was changed for a compound represented by the following average molecular formula (28A), to obtain 63 g of a liquid. This was taken as an intermediate 28B.

(28A)

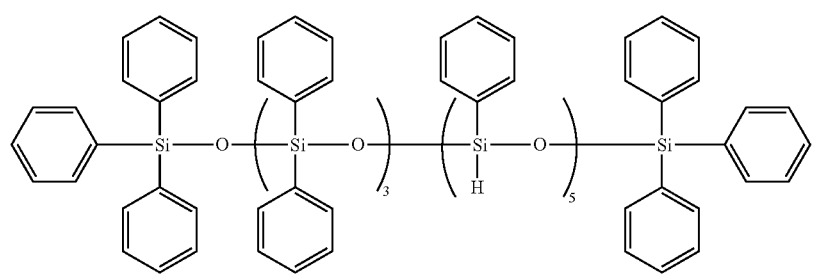

Next, treatment was carried out in the same way as the "step 5-2" except that the intermediate 5B was changed for 40.0 g of the intermediate 28B, to obtain 45.4 g of a liquid. This was taken as an intermediate 28C. Finally, treatment was carried out in the same way as the "step 5-3" except that the α-methylstyrene was changed for 50 g of a compound represented by the following average molecular formula (28D) and the intermediate 5D was changed for 40 g of the intermediate 28C, to obtain a compound 28.

(28D)

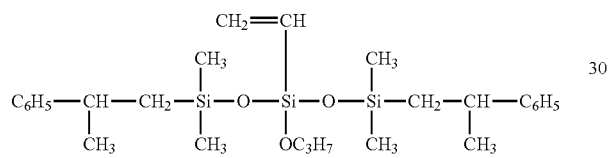

The compound 28 was a compound having an average molecular formula shown by the following formula (A-28). Its average molecular weight as above was 4,500. What was represented by the formula (2) was in a content of 22.7%.

(A-28)

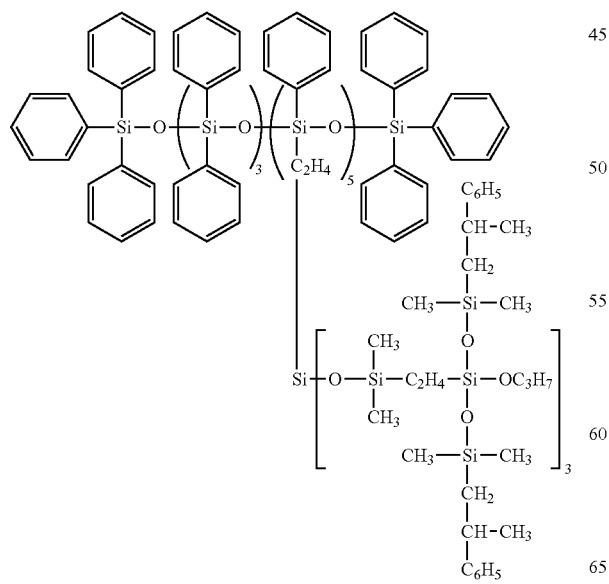

Production Example 29

Production of Compound 29

Into a 200 ml four-necked flask, 27.0 g of a compound represented by the following average molecular formula (29A) and 7.5 mg of a divinylhexamethyldisiloxane solution of a platinum divinyltetramethyldisiloxane complex (platinum concentration in solution: 4% by mass) were fed, and these were heated to 140° C. with stirring. Then, to the resultant mixture, 20.3 g of a compound represented by the following average molecular formula (29B) was dropwise added over a period of 30 minutes. After its addition made dropwise was completed, the reaction solution formed was heated at 140° C. for 2 hours, which was then cooled to obtain a compound 29.

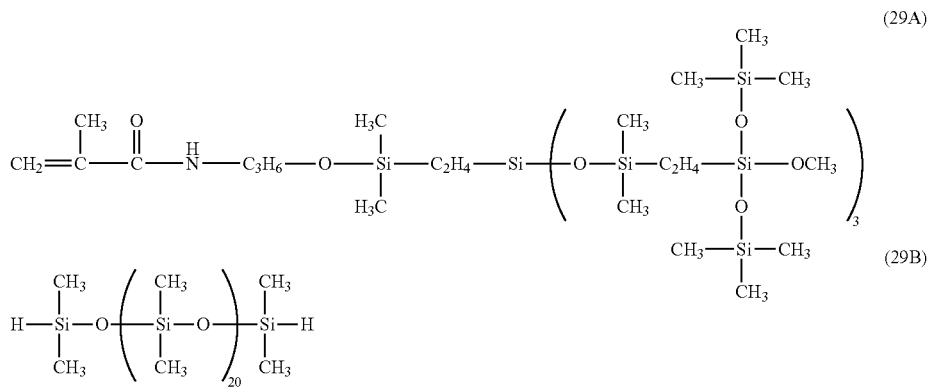

The compound 29 was a compound having an average molecular formula shown by the following formula (A-29). Its average molecular weight as above was 2,800. What was represented by the formula (2) was in a content of 4.3%.

Production Example 30

Production of Compound 30

Into a 200 ml four-necked flask, 15 g of a compound represented by the following average molecular formula (30A), 26 g of a compound represented by the following average molecular formula (30B) and 7.5 mg of a divinylhexamethyldisiloxane solution of a platinum divinyltetramethyldisiloxane complex (platinum concentration in solution: 4% by mass) were fed, and these were heated to 140° C. with stirring. Then, to the resultant mixture, 10 g of a compound represented by the following average molecular formula (30C) was dropwise added over a period of 30 minutes. After its addition made dropwise was completed, the reaction solution formed was heated at 140° C. for 2 hours, which was then cooled to obtain a compound 30.

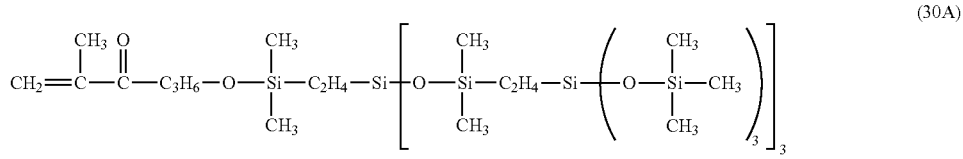

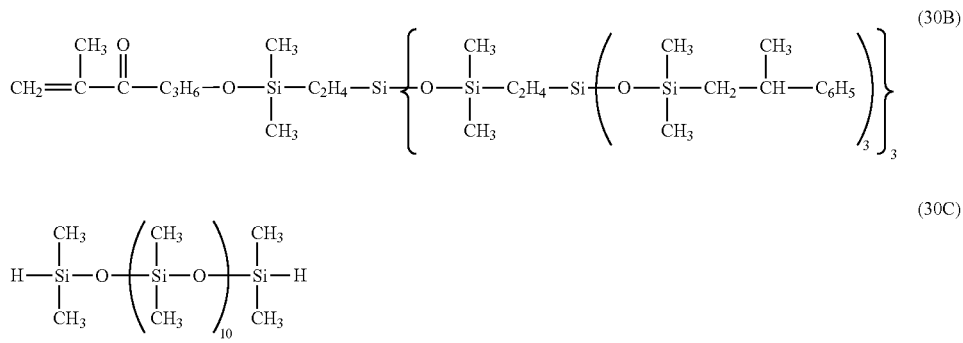

(30B)

(30C)

The compound 30 was a compound having an average molecular formula shown by the following formula (A-30). Its average molecular weight as above was 4,000. What was represented by the formula (2) was in a content of 9.1%.

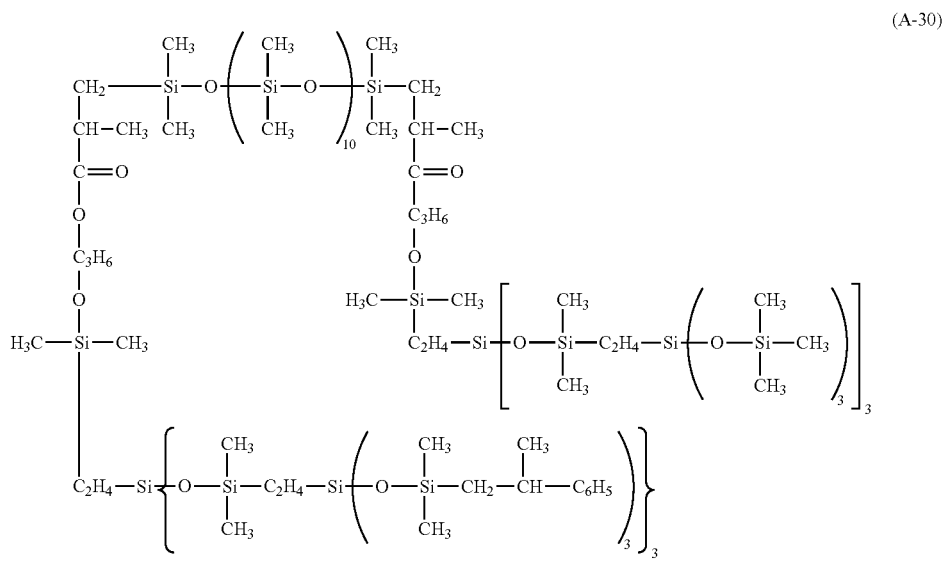

(A-30)

Production Example 31

Production of Compound 31

Into a 200 ml four-necked flask, 15 g of the compound represented by the average molecular formula (30A), 26 g of the compound represented by the average molecular formula (30B) and 7.5 mg of a divinylhexamethyldisiloxane solution of a platinum divinyltetramethyldisiloxane complex (platinum concentration in solution: 4% by mass) were fed, and these were heated to 140° C. Then, to the resultant mixture, 2.35 g of a compound represented by the following average molecular formula (31C) was dropwise added over a period of 30 minutes. After its addition made dropwise was completed, the reaction solution formed was heated at 140° C. for 2 hours, which was then cooled to obtain a compound 31.

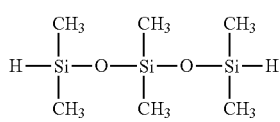

(31C)

The compound 31 was a compound having an average molecular formula shown by the following formula (A-31). Its average molecular weight as above was 3,200. What was represented by the formula (2) was in a content of 50%.

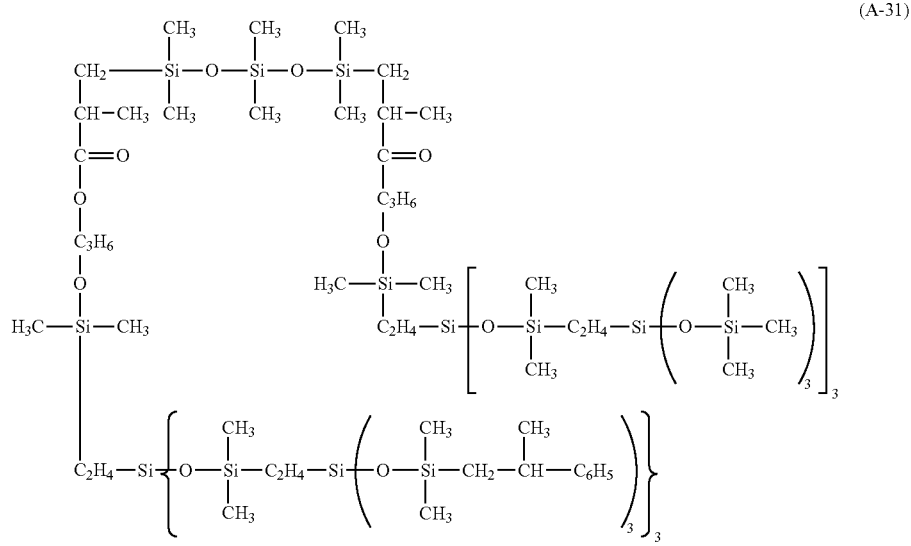

(A-31)

Production Example 32

Production of Compound 32

Into a 200 ml four-necked flask, 15 g of the compound represented by the average molecular formula (30A), 26 g of the compound represented by the average molecular formula (30B) and 7.5 mg of a divinylhexamethyldisiloxane solution of a platinum divinyltetramethyldisiloxane complex (platinum concentration in solution: 4% by mass) were fed, and these were heated to 140° C. with stirring. Then, to the resultant mixture, 8.5 g of a compound represented by the following average molecular formula (32C) was dropwise added over a period of 30 minutes. After its addition made dropwise was completed, the reaction solution formed was heated at 140° C. for 2 hours, which was then cooled to obtain a compound 32.

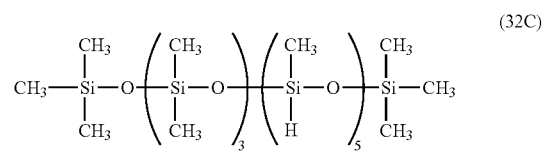

(32C)

The compound 32 was a compound having an average molecular formula shown by the following formula (A-32). Its average molecular weight as above was 6,000. What was represented by the formula (2) was in a content of 22.7%.

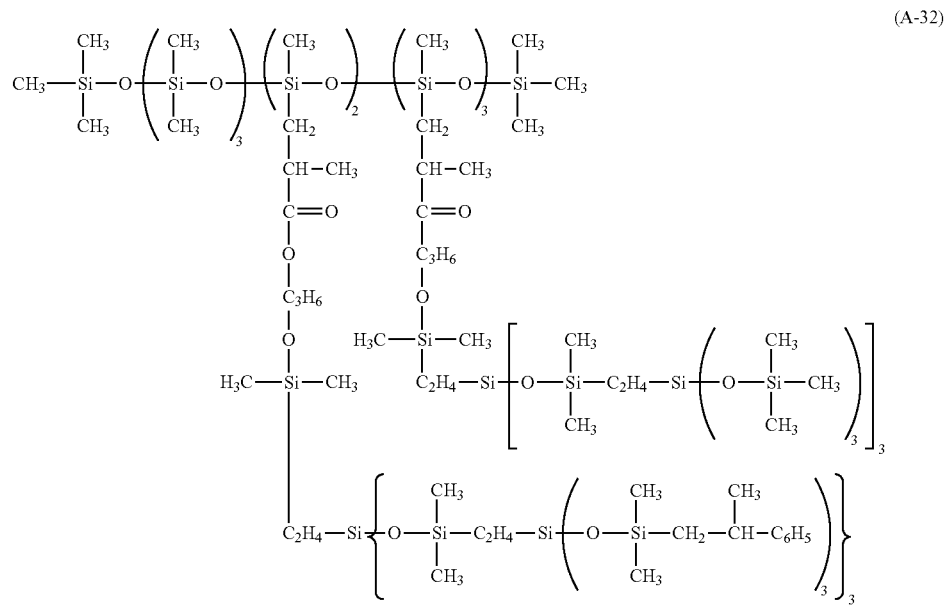

(A-32)

Production Example 33

Production of Composite Conductive Fine Particles

To 7.0 kg of silica particles (average particle diameter: 15 nm; volume resistivity: $1.8 \times 10^{12}$ Ω·cm), 140 g of methylhydrogenpolysiloxane was added operating an edge runner mill. Then, these materials were mixed and agitated for 30 minutes at a linear load of 588 N/cm (60 kg/cm). Here, the agitation was carried out at a rate of 22 rpm. To what was thus agitated, 7.0 kg of carbon black particles (particle diameter: 20 nm; volume resistivity: $1.0 \times 10^{2}$ Ω·cm) were added over a period of 10 minutes, operating the edge runner mill, and these materials were further mixed and agitated for 60 minutes at a linear load of 588 N/cm (60 kg/cm). Thus, the carbon black was made to adhere to the surfaces of silica particles having been coated with methylhydrogenpolysiloxane, followed by drying at 80° C. for minutes by means of a dryer to obtain composite conductive fine particles. Here, the agitation was carried out at a rate of 22 rpm. The composite conductive fine particles obtained had an average particle diameter of 15 nm and a volume resistivity of $1.1 \times 10^{2}$ Ω·cm.

Production Example 34

Production of Surface-Treated Titanium Oxide Particles 1,000 g of acicular rutile type titanium oxide particles (average particle diameter: 15 nm; length/breadth=3:1; volume resistivity: $2.3 \times 10^{10}$ Ω·cm) was compounded with 110 g of isobutyltrimethoxysilane as a surface treating agent and 3,000 g of toluene as a solvent to prepare a slurry. This slurry was mixed for 30 minutes by means of a stirrer, and thereafter fed to Visco mill the effective internal volume of which was filled by 80% with glass beads of 0.8 mm in average particle diameter, to carry out wet-process disintegration treatment at a temperature of $35 \pm 5°$ C.

The slurry obtained by wet disintegration treatment was distilled under reduced pressure by using a kneader (bath temperature: 110° C.; product temperature: 30° C. to 60° C.; degree of reduced pressure: about 100 Torr) to remove the toluene, followed by baking of the surface treating agent at 120° C. for 2 hours. The particles having been treated by baking were cooled to room temperature, and thereafter pulverized by means of a pin mill to obtain surface-treated titanium oxide particles.

Production Example 35

Formation of Roller Having Elastic Layer

A rod made of stainless steel of 6 mm in diameter and 252.5 mm in length and coated with a thermosetting adhesive incorporated with 10% by mass of carbon black was used as a conductive support.

To 100 parts by mass of epichlorohydrin rubber (EO-EP-AGE terpolymer; EO/EP/AGE=73 mol %/23 mol %/4 mol %), components shown in Table 1 below were added, and the mixture obtained was kneaded for 10 minutes by means of a closed mixer temperature-controlled at 50° C., to obtain a raw-material compound.

TABLE 1

| | |
|---|---|
| Calcium carbonate | 60 parts by mass |
| Aliphatic polyester type plasticizer | 10 parts by mass |
| Zinc stearate | 1 part by mass |
| 2-Mercaptobenzimidazole (MB) (age resistor) | 0.5 part by mass |
| Zinc oxide | 2 parts by mass |
| Quaternary ammonium salt | 2 parts by mass |
| Carbon black (average particle diameter: 100 nm; volume resistivity: 0.1 Ω · cm) | 5 parts by mass |

To the above raw-material compound, 0.8 part by mass of sulfur as a vulcanizing agent, and as vulcanization accelerators 1 part by mass of dibenzothiazyl sulfide (DM) and 0.5 part by mass of tetramethylthiuram monosulfide (TS) were added, and these were kneaded for 10 minutes by means of a twin-roll mill kept cooled to 20° C., to obtain an elastic layer compound.

The elastic layer compound was extruded together with the above conductive support by using an extruder having a cross-head, and was so formed as to be shaped into a roller of about 9 mm in external diameter. Then, this was vulcanized and the adhesive was cured, in an electric oven and at 160° C. for 1 hour. Then, both end portions of the rubber obtained were cut off to make the rubber be 228 mm in length, and thereafter this was sanded on its peripheral surface so as to be shaped into a roller of 8.5 mm in external diameter, to form an elastic layer on the conductive support. Thus, a roller having the elastic layer was obtained. Here, this roller was in a crown level (the difference in external diameter between that at the middle portion and that at positions 90 mm away from the middle portion) of 120 μm.

Example 1

Preparation of Surface Layer Coating Liquid

To a caprolactone modified acrylic polyol solution "PLACCEL DC2016" (trade name; available from Daicel Chemical Industries, Ltd.), methyl isobutyl ketone was added to adjust the former's solid content so as to be 14% by mass. To 714.3 parts by mass of the solution obtained (100 parts by mass of the acrylic polyol solid content), components shown in Table 2 below were added to prepare a mixture solution.

TABLE 2

| | |
|---|---|
| Composite conductive fine particles (made in Production Example 33) | 45 parts by mass |
| Surface-treated titanium oxide particles (made in Production Example 34) | 20 parts by mass |
| Modified dimethylsilicone oil (*1) | 0.08 part by mass |
| Blocked isocyanate mixture (*2) | 80.14 parts by mass |

Here, the blocked isocyanate mixture was in an amount given by "NCO/OH=1.0".
(*1): modified dimethylsilicone oil "SH28PA" (trade name: available from Dow Corning Toray Silicone Co., Ltd.).
(*2): 7:3 mixture of hexamethylene diisocyanate (HDI) "DURANATE TPA-B80E" (trade name; available from Asahi Chemical Industry Co. Ltd.) and isophorone diisocyanate (IPDI) "BESTANATO B1370" (trade name; available from Degussa-Hulls AG) each blocked with butanone oxime.

200 g of the above mixture solution was put into a glass bottle of 450 ml in internal volume together with 200 g of glass beads of 0.8 mm in average particle diameter as dispersion media, followed by dispersion for 24 hours by using a paint shaker dispersion machine. At the same time, a methyl isobutyl ketone solution was readied into which 30% of the compound 4 obtained in Production Example 4 was dissolved. After the dispersion was completed, 2.24 g of polymethyl methacrylate resin particles of 10 μm in average particle diameter and 7.47 g of the methyl isobutyl ketone solution were added thereto. (The polymethyl methacrylate resin particles and the compound 4 were both in amounts each corresponding to 10 parts by mass based on 100 parts by mass of the acrylic polyol solid content.)

Thereafter, the dispersion was carried out for 1 hour, and then the glass beads were removed to obtain a surface layer coating liquid.

Production of Charging Roller

Using the surface layer coating liquid thus obtained, the roller having the elastic layer, made in Production Example 35, was coated therewith by dipping once. The coating formed was air-dried at normal temperature for minutes or more, and thereafter dried by means of a circulating hot-air drier at 80° C. for 1 hour and further at 160° C. for 1 hour to obtain a charging roller having the elastic layer and a surface layer formed thereon. Here, conditions for the dipping are as follows: Dipping time was 9 seconds, the rate of draw-up of dip-coating was 20 mm/s for initial-stage rate and 2 mm/s for end rate, during which the rate was changed linearly with respect to the time.

Measurement of Electrical Resistance Value of Charging Roller

Using the electrical resistance value measuring instrument shown in FIGS. 2A and 2B, the electrical resistance of the charging roller was measured. First, by the aid of bearings 33, the charging roller 45 was brought into contact with the columnar metal 32 (diameter: 30 mm) in such a way that the charging roller 45 was in parallel to the charging roller 45 (FIG. 2A). Here, the force of contact between them was so controlled as to be 4.9 N at each end portion, 9.8 N at both end portions in total, by the force of pressing by springs.

Next, the charging roller was follow-up rotated as the columnar metal 32 was driven and rotated by means of a motor (not shown) at a peripheral speed of 45 mm/second. While it was follow-up rotated, a DC voltage of −200 V was applied thereto from a stabilized power source 34, and the value of electric current flowing to the charging roller was measured with the ammeter 35.

The resistance value of the charging roller was calculated from the values of applied voltage and electric current. The electrical resistance value was measured after the charging roller was left to stand in an environment of N/N (normal temperature and normal humidity: 23° C./55% RH) for 24 hours or more. The charging roller had an electrical resistance value of $3.5 \times 10^5 \Omega$.

Evaluation on Occurrence of C-Set Images

As the electrophotographic apparatus set up as shown in FIG. 4, a color laser beam printer (trade name: COLOR LASER JET 3800; manufactured by CANON INC.) was used after it was so converted as to have a recording medium feeding speed of 200 mm/sec (A4-size lengthwise feeding). Image resolution was 600 dpi, and primary charging was at an output of DC voltage −1,100 V.

Figure 5:
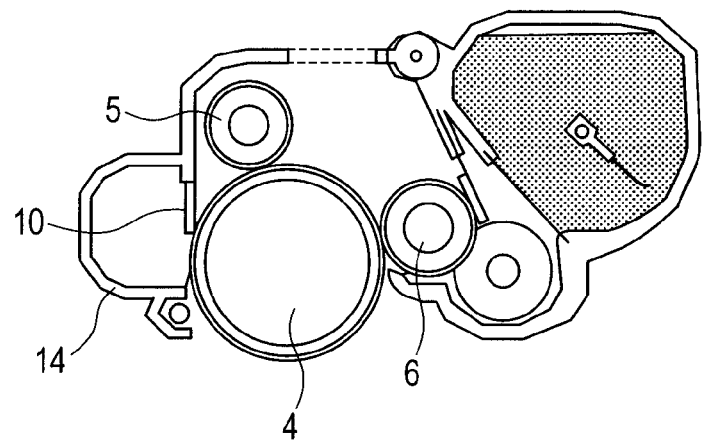
FIG. 5 is a sectional view of an embodiment of the process cartridge according to the present invention.

As the process cartridge set up as shown in FIG. 5, a process cartridge for black of the above color laser beam printer was used. This process cartridge was fitted with the charging roller of this Example.

Figure 6:
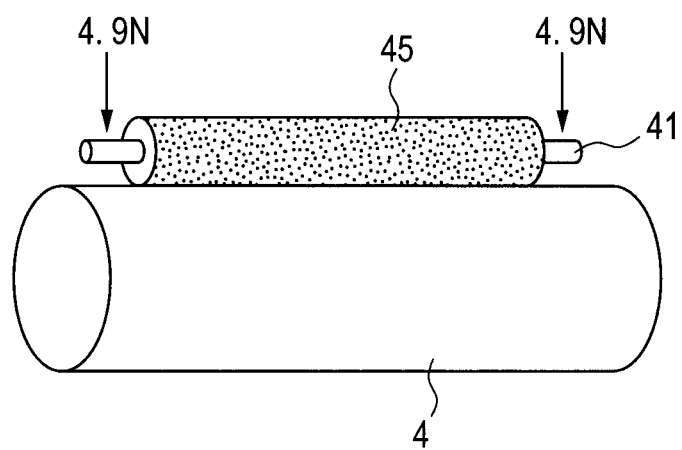
FIG. 6 is a schematic view showing how the charging roller of the present invention is in contact with an electrophotographic photosensitive member.

The charging roller 45 was brought into contact with the electrophotographic photosensitive member 4 at a contact force of 4.9 N at each end portion, 9.8 N at both end portions in total, by the force of pressing by springs (FIG. 6). This process cartridge was left to stand in an environment of temperature 40° C. and humidity 95% RH for a month (severity leaving). Next, the process cartridge was left to stand in an environment of temperature 23° C. and humidity 50% RH for 6 hours, and thereafter mounted to the electrophotographic apparatus, where halftone images (such images that horizontal lines of one dot in width and two dots in space were drawn in the direction perpendicular to the rotational direction of the photosensitive member) were reproduced on three sheets in the like environment. About the halftone images reproduced on three sheets, whether or not any lines had occurred which were to be caused by the C-set of the charging roller was visually observed to make evaluation according to criteria shown in Table 3 below.

TABLE 3

| Rank 1 | Any lines or the like caused by the C-set of the charging roller are not seen on all the three sheets. |
|---|---|
| Rank 2 | Pale lines are seen to have occurred on one sheet in cycles of revolution of the charging roller. |
| Rank 3 | Pale lines are seen to have occurred on two sheets in cycles of revolution of the charging roller. |
| Rank 4 | Clear lines are seen to have occurred on three sheets in cycles of revolution of the charging roller. |

Measurement of C-Set Level

After the images were reproduced, the charging roller was taken off the process cartridge, and the radius of the charging roller at its C-set part and any non-C-set part each was measured. The difference in radius between the C-set part and the non-C-set part is the C-set level. It was measured with a full-automatic roller measuring instrument manufactured by Tokyo Opto-Electronics Co., Ltd.

The charging roller was rotated by every 1°, and the measurement was made at positions corresponding to the C-set part and the non-C-set part, about three spots that are at the middle in the lengthwise direction of the charging roller and at positions 90 mm on the right and left each from the middle thereof. Next, the difference between the maximum value of radii at the C-set part and the minimum value of radii at the non-C-set part was calculated. The value showing the largest difference in radii among those at the three spots was taken as the C-set level in the present invention. The results are shown in Table 7. "Deformation level" in Table 7 corresponds to the C-set level. The charging roller of the present invention did not cause any C-set images, and good images were obtained.

Example 2

To a caprolactone modified acrylic polyol solution, methyl isobutyl ketone was added to adjust the former's solid content so as to be 17% by mass. To 588.24 parts by mass of the solution obtained (100 parts by mass of the acrylic polyol solid content), components shown in Table 4 below were added to prepare a mixture solution.

TABLE 4

| Carbon black "#52" (available from Mitsubishi Chemical Corporation) | 50 parts by mass |
|---|---|
| Modified dimethylsilicone oil (*1) | 0.08 part by mass |
| Blocked isocyanate mixture (*2) | 80.14 parts by mass |

Here, the blocked isocyanate mixture was in an amount given by "NCO/OH=1.0" in terms of the isocyanate amount. (*1) & (*2): The same as Example 1.

208.6 g of the above mixture solution was put into a glass bottle of 450 ml in internal volume together with 200 g of glass beads of 0.8 mm in average particle diameter as dispersion media, followed by dispersion for 24 hours by using a paint shaker dispersion machine. After the dispersion was completed, 2.72 g of polymethyl methacrylate resin particles of 10 μm in average particle diameter and 1.36 g of the compound 2 obtained in Production Example 2 were added thereto. (The polymethyl methacrylate resin particles and the compound 2 were both in amounts each corresponding to 10 parts by mass based on 100 parts by mass of the acrylic polyol solid content.)

The subsequent procedure in Example 1 was repeated to produce a charging roller. About the charging roller produced, the measurement of the electrical resistance value of the charging roller, the measurement of the C-set level and the evaluation on the C-set images were made in the same way as Example 1. The results are shown in Table 7.

Example 3

A caprolactone modified acrylic polyol solution was prepared in the same way as Example 2. To 588.24 parts by mass of the solution obtained (100 parts by mass of the acrylic polyol solid content), components shown in Table 5 below were added to prepare a mixture solution.

TABLE 5

| | |
|---|---|
| Carbon black "#52" (available from Mitsubishi Chemical Corporation) | 50 parts by mass |
| Modified dimethylsilicone oil (*1) | 0.08 part by mass |
| Blocked isocyanate mixture (*2) | 80.14 parts by mass |
| Compound 5 obtained in Production Example 5 (*3) | 10 parts by mass |

Here, the blocked isocyanate mixture was in an amount given by "NCO/OH=1.0" in terms of the isocyanate amount. (*1) & (*2): The same as Example 1.
(*3): An acetone solution was readied into which 30% of the compound 5 was dissolved, and was so added that the compound 5 was in the above parts by mass based on 100 parts by mass of the acrylic polyol solid content.

208.6 g of the above mixture solution was put into a glass bottle of 450 ml in internal volume together with 200 g of glass beads of 0.8 mm in average particle diameter as dispersion media, followed by dispersion for 24 hours by using a paint shaker dispersion machine. After the dispersion was completed, 2.72 g of polymethyl methacrylate resin particles of 10 μm in average particle diameter were added thereto. (The polymethyl methacrylate resin particles were in an amount corresponding to 10 parts by mass based on 100 parts by mass of the acrylic polyol solid content.)

The subsequent procedure in Example 1 was repeated to produce a charging roller. About the charging roller produced, the measurement of the electrical resistance value of the charging roller, the measurement of the C-set level and the evaluation on the C-set images were made in the same way as Example 1. The results are shown in Table 7. The charging roller of this Example did not cause any C-set images, and good images were obtained.

Example 4

To polyvinyl butyral, ethanol was added to adjust the former's solid content so as to be 20% by mass. To 500 parts by mass of the solution obtained (100 parts by mass of the polyvinyl butyral solid content), components shown in Table 6 below were added to prepare a mixture solution.

TABLE 6

| | |
|---|---|
| Carbon black "#52" (available from Mitsubishi Chemical Corporation) | 50 parts by mass |
| Compound 11 obtained in Production Example 11 | 10 parts by mass |
| Modified dimethylsilicone oil (*1) | 0.08 part by mass |

(*1): The same as Example 1.

190.4 g of the above mixture solution was put into a glass bottle of 450 ml in internal volume together with 200 g of glass beads of 0.8 mm in average particle diameter as dispersion media, followed by dispersion for 24 hours by using a paint shaker dispersion machine. After the dispersion was completed, 3.2 g of polymethyl methacrylate resin particles of 10 μm in average particle diameter were added thereto. (The polymethyl methacrylate resin particles were in an amount corresponding to 10 parts by mass based on 100 parts by mass of the polyvinyl butyral solid content.)

The subsequent procedure in Example 1 was repeated to produce a charging roller. About the charging roller produced, the measurement of the electrical resistance value of the charging roller, the measurement of the C-set level and the evaluation on the C-set images were made in the same way as Example 1. The results are shown in Table 7.

Examples 5 to 27

Charging rollers were produced in the same way as Example 3 except that the compound 5 was changed for compounds shown in Table 7. The related "parts by mass" in Table 7 is parts by mass based on 100 parts by mass of the acrylic polyol solid content. About the charging rollers produced, the measurement of the electrical resistance value of each charging roller, the measurement of the C-set level and the evaluation on the C-set images were made in the same way as Example 1. The results are shown in Table 7.

The charging rollers of Examples 5 to 7 and Examples 25 to 27 did not cause any C-set images, but provided good images. With the charging rollers of Examples 8 to 15 used, images at a level of rank-2 images were obtained.

Examples 28, 29, 32 and 33

Charging rollers were produced in the same way as Example 1 except that the types and parts by mass of compounds were changed as shown in Table 7 and the time of 24 hours for the paint shaker dispersion was changed to 36 hours. The related "part by mass" in Table 7 is part by mass based on 100 parts by mass of the acrylic polyol solid content. About the charging rollers produced, the measurement of the electrical resistance value of each charging roller, the measurement of the C-set level and the evaluation on the C-set images were made in the same way as Example 1. The results are shown in Table 7.

Examples 30, 31, 34 and 35 to 39 Charging rollers were produced in the same way as Example 1 except that the types and parts by mass of compounds were changed as shown in Table 7. The related "parts by mass" in Table 7 is parts by mass based on 100 parts by mass of the acrylic polyol solid content. About the charging rollers produced, the measurement of the electrical resistance value of each charging roller, the measurement of the C-set level and the evaluation on the C-set images were made in the same way as Example 1. The results are shown in Table 7.

The charging rollers of Examples 30, 31, 36 and 38 did not cause any C-set images, and but produced good images. With the charging rollers of Examples 34 and 37, images at a level of rank-2 images were obtained. In the charging roller of Example 39, images at a level of rank-3 images were obtained.

Comparative Example 1

A charging roller was produced in the same way as Example 4 except that the compound 11 was not added. About the charging roller produced, the measurement of the electrical resistance value of the charging roller, the measurement of the C-set level and the evaluation on the C-set images were made in the same way as Example 1. The results are shown in Table 7.

Comparative Example 2

A charging roller was produced in the same way as Example 4 except that the compound 11 was changed for dimethylsilicone oil "KF-96L-5cs" (trade name; available from Shin-Etsu Chemical Co., Ltd.), which was in parts by mass changed as shown in Table 7. The related "parts by mass" in Table 7 is parts by mass based on 100 parts by mass of the acrylic polyol solid content. About the charging roller produced, the measurement of the electrical resistance value of the charging roller, the measurement of the C-set level and the evaluation on the C-set images were made in the same way as Example 1. The results are shown in Table 7.

Comparative Example 3

A charging roller was produced in the same way as Comparative Example 1 except that the dimethylsilicone oil was changed for "SH200-100cs" (trade name: available from Dow Corning Toray Silicone Co., Ltd.). About the charging roller produced, the measurement of the electrical resistance value of the charging roller, the measurement of the C-set level and the evaluation on the C-set images were made in the same way as Example 1. The results are shown in Table 7.

Comparative Example 4

A charging roller was produced in the same way as Comparative Example 3 except that the type and parts by mass of the compound were changed as shown in Table 7. The related "parts by mass" in Table 7 is parts by mass based on 100 parts by mass of the acrylic polyol solid content. About the charging rollers produced, the measurement of the electrical resistance value of the charging roller, the measurement of the C-set level and the evaluation on the C-set images were made in the same way as Example 1. The results are shown in Table 7.

Comparative Example 5

A charging roller was produced in the same way as Comparative Example 2 except that the dimethylsilicone oil was changed for "KF-96H-100000cs" (trade name; available from Shin-Etsu Chemical Co., Ltd.). About the charging roller produced, the measurement of the electrical resistance value of the charging roller, the measurement of the C-set level and the evaluation on the C-set images were made in the same way as Example 1. The results are shown in Table 7. The images obtained by using the charging roller of this Comparative Example were at a level of rank-4 images.

TABLE 7

|  | Compound | Part(s) by mass of compound | Deformation level (μm) | Charging roller electrical resistance (Ω) | Image ranking |
|---|---|---|---|---|---|
| Example: | | | | | |
| 1 | Compound 4 | 5 | 9 | $3.5 \times 10^5$ | 1 |
| 2 | Compound 3 | 10 | 8 | $5.0 \times 10^5$ | 1 |
| 3 | Compound 5 | 5 | 10 | $1.2 \times 10^5$ | 1 |
| 4 | Compound 11 | 10 | 9 | $1.0 \times 10^6$ | 1 |
| 5 | Compound 20 | 5 | 10 | $7.0 \times 10^5$ | 1 |
| 6 | Compound 17 | 5 | 9 | $8.3 \times 10^5$ | 1 |
| 7 | Compound 8 | 5 | 10 | $4.5 \times 10^5$ | 1 |
| 8 | Compound 18 | 5 | 11 | $1.4 \times 10^6$ | 2 |
| 9 | Compound 16 | 5 | 10 | $2.6 \times 10^5$ | 2 |
| 10 | Compound 12 | 5 | 10 | $9.1 \times 10^5$ | 2 |
| 11 | Compound 7 | 5 | 12 | $9.7 \times 10^5$ | 2 |
| 12 | Compound 6 | 5 | 10 | $1.7 \times 10^5$ | 2 |
| 13 | Compound 23 | 5 | 11 | $1.2 \times 10^5$ | 2 |
| 14 | Compound 24 | 5 | 10 | $4.5 \times 10^5$ | 2 |
| 15 | Compound 28 | 5 | 11 | $9.8 \times 10^5$ | 2 |
| 16 | Compound 22 | 5 | 13 | $3.3 \times 10^5$ | 3 |
| 17 | Compound 21 | 5 | 11 | $5.0 \times 10^6$ | 3 |
| 18 | Compound 19 | 5 | 11 | $2.3 \times 10^6$ | 3 |
| 19 | Compound 15 | 5 | 11 | $2.8 \times 10^5$ | 3 |
| 20 | Compound 13 | 5 | 13 | $2.4 \times 10^5$ | 3 |
| 21 | Compound 2 | 5 | 12 | $7.3 \times 10^5$ | 3 |
| 22 | Compound 1 | 5 | 11 | $6.7 \times 10^5$ | 3 |
| 23 | Compound 9 | 5 | 13 | $9.6 \times 10^5$ | 3 |
| 24 | Compound 10 | 5 | 15 | $2.3 \times 10^6$ | 3 |
| 25 | Compound 25 | 5 | 8 | $9.8 \times 10^4$ | 1 |
| 26 | Compound 26 | 5 | 8 | $6.4 \times 10^5$ | 1 |
| 27 | Compound 27 | 5 | 9 | $5.5 \times 10^5$ | 1 |
| 28 | Compound 4 | 0.5 | 12 | $2.3 \times 10^5$ | 1 |
| 29 | Compound 4 | 1 | 10 | $9.7 \times 10^5$ | 1 |
| 30 | Compound 4 | 30 | 9 | $3.5 \times 10^5$ | 1 |
| 31 | Compound 16 | 50 | 10 | $6.3 \times 10^5$ | 1 |
| 32 | Compound 4 | 1 | 11 | $2.1 \times 10^5$ | 1 |
| 33 | Compound 4 | 0.5 | 11 | $5.6 \times 10^4$ | 1 |
| 34 | Compound 1 | 30 | 10 | $8.9 \times 10^5$ | 2 |
| 35 | Compound 2 | 50 | 12 | $3.4 \times 10^6$ | 3 |
| 36 | Compound 30 | 5 | 10 | $2.0 \times 10^5$ | 1 |
| 37 | Compound 31 | 5 | 13 | $1.0 \times 10^5$ | 2 |
| 38 | Compound 32 | 5 | 11 | $3.4 \times 10^5$ | 1 |
| 39 | Compound 29 | 5 | 13 | $3.0 \times 10^5$ | 3 |
| Comparative Example: | | | | | |
| 1 | — | 0 | 18 | $5.0 \times 10^4$ | 4 |
| 2 | Silicone oil | 5 | 19 | $6.0 \times 10^6$ | 4 |
| 3 | Silicone oil | 5 | 19 | $3.6 \times 10^5$ | 4 |
| 4 | Compound 14 | 5 | 15 | $1.2 \times 10^5$ | 4 |
| 5 | Silicone oil | 5 | 19 | $4.0 \times 10^5$ | 4 |

Reference Signs List

| 1 | conductive support |
| 2 | elastic layer |
| 3 | surface layer |
| 4 | electrophotographic photosensitive member |
| 5 | charging member (charging roller) |
| 6 | developing roller |
| 7 | transfer material |
| 8 | transfer roller |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2010-228367, filed on Oct. 8, 2010, which is herein incorporated by reference as part of this application.

What is claimed is:

1. A charging member comprising a conductive support, an elastic layer, and a surface layer;

wherein:

the surface layer comprises a binder and a compound represented by the following formula (1):

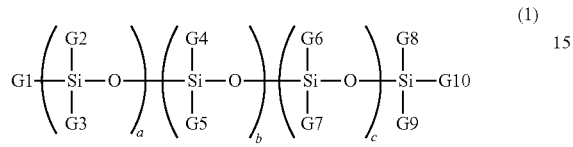

where, in the formula (1),

G1 to G10 each independently represent a hydrogen atom, an alkyl group having 1 to 3 carbon atom(s), a phenyl group or a group represented by the following formula (2), provided that one or two or more selected from G1 to G10 is/are the group(s) represented by the following formula (2);

and a, b and c each represent an integer of 1 or more with the proviso that the group represented by the following formula (2) exists in the molecule of the compound:

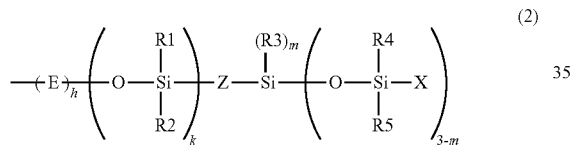

where, in the formula (2), h and k are each 0 or 1, and m is 0 or 1; E and Z each independently represent an alkylene group having 2 to 6 carbon atoms, a phenylene group which may be substituted with a methyl group or ethyl group, or a group represented by the following formula (3) or the following formula (4); R1, R2, R4 and R5 each independently represent an alkyl group having 1 to 3 carbon atom(s) or a phenyl group; R3 represents an alkoxyl group having 1 to 3 carbon atom(s) or a trimethylsiloxy group; X represents a hydrogen atom, an alkyl group having 1 to 15 carbon atom(s), a phenyl group which may be substituted with a methyl group or ethyl group, an allyl group, a vinyl group or a group represented by the following formula (6) or the formula (2):

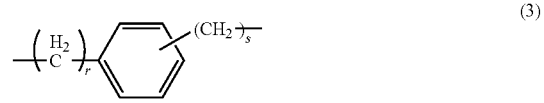

where, in the formula (3), r and s each represent an integer of 0 to 3, and either of r and s is 1 or more:

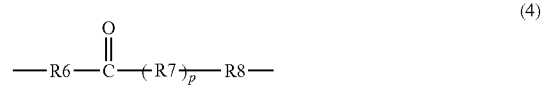

where, in the formula (4), p is 0 or 1, R6 and R8 each represent an alkylene group having 1 to 4 carbon atom(s), and R7 represents an oxygen atom or a group represented by the following formula (5):

where, in the formula (6), q is an integer of 1 to 4, and R9 represents a hydrogen atom or a methyl group.

2. A process cartridge comprising the charging member according to claim 1 and a charging object member, and being so constituted as to be detachably mountable to the main body of an electrophotographic apparatus.

3. An electrophotographic apparatus comprising the charging member according to claim 1 and a charging object member disposed in contact with the charging member.

* * * * *